US011884534B2

(12) United States Patent
Brost et al.

(10) Patent No.: US 11,884,534 B2
(45) Date of Patent: Jan. 30, 2024

(54) SYSTEM FOR EMERGENCY PRESSURE RELIEF AND VAPOR CAPTURE

(71) Applicant: CARBOVATE DEVELOPMENT CORP., Sarnia (CA)

(72) Inventors: Edward John Brost, Brights Grove (CA); Gary Stewart Locke, Calgary (CA)

(73) Assignee: CARBOVATE DEVELOPMENT CORP., Sarnia (CA)

(*) Notice: Subject to any disclaimer, the term of this patent is extended or adjusted under 35 U.S.C. 154(b) by 0 days.

(21) Appl. No.: 18/077,230

(22) Filed: Dec. 8, 2022

(65) Prior Publication Data

US 2023/0264942 A1 Aug. 24, 2023

Related U.S. Application Data

(60) Provisional application No. 63/312,222, filed on Feb. 21, 2022.

(51) Int. Cl.

*B67D 7/54* (2010.01)
*F17C 13/04* (2006.01)
*F17C 5/02* (2006.01)

(52) U.S. Cl.

CPC .................. *B67D 7/54* (2013.01); *F17C 5/02* (2013.01); *F17C 13/04* (2013.01); (Continued)

(58) Field of Classification Search

CPC ... B67D 7/54; F17C 5/02; F17C 13/04; F17C 2205/0326; F17C 2205/0332; (Continued)

(56) References Cited

U.S. PATENT DOCUMENTS 5,246,034 A * 9/1993 Higgins ................ F16K 17/196 251/86
5,516,119 A * 5/1996 Trackwell .............. F16J 15/004 277/409

(Continued)

FOREIGN PATENT DOCUMENTS

WO 2022079407 A1 4/2022

Primary Examiner — Nicolas A Arnett

(74) *Attorney, Agent, or Firm* — HOLLOWELL PATENT GROUP; Kelly Hollowell

(57) ABSTRACT

Preloading a containment vessel with Low Vapor Pressure (LVP) liquid; partially evacuating the containment vessel to generate a vacuum in a headspace above the LVP liquid; and relieving material from a process vessel into the containment vessel during a process relief event in the process vessel. The containment vessel pressure may be equalized with ambient conditions prior to preloading the LVP liquid. The containment vessel size and quantity of LVP liquid may be determined to absorb the energy and mass of relieving fluids from the maximum anticipated relief scenario, permitting the gases to condense to liquid form to be recovered in liquid state instead of atmospherically venting or combusting the gases. The containment vessel headspace may be partially occupied with High Vapor Pressure (HVP) liquid comprising C5-C10 hydrocarbons configured to flash during the evacuation step to create and occupy a headspace, providing additional head space volume and heat rejection capacity.

30 Claims, 13 Drawing Sheets

(52) U.S. Cl.
CPC ................. *F17C 2205/0326* (2013.01); *F17C 2205/0332* (2013.01); *F17C 2221/032* (2013.01); *F17C 2227/0135* (2013.01); *F17C 2227/03* (2013.01); *F17C 2260/044* (2013.01)

(58) Field of Classification Search
CPC ........ F17C 2221/032; F17C 2227/0135; F17C 2227/03; F17C 2260/044
See application file for complete search history.

(56) References Cited

U.S. PATENT DOCUMENTS

| | | | | |
|---|---|---|---|---|
| 5,687,776 | A | 11/1997 | Forgash et al. | |
| 7,255,136 | B2 * | 8/2007 | Templet | F04B 39/00<br>141/286 |
| 9,046,062 | B2 * | 6/2015 | Tice | F02M 35/024 |
| 10,141,814 | B2 * | 11/2018 | Caristan | F02C 1/002 |
| 10,526,425 | B2 * | 1/2020 | Cornelissen | E21B 17/01 |
| 11,174,991 | B2 * | 11/2021 | Thor | F17C 5/06 |
| 2006/0010882 | A1 | 1/2006 | Oldham et al. | |
| 2007/0214830 | A1 * | 9/2007 | Arnold | F17C 11/005<br>62/607 |
| 2012/0144846 | A1 * | 6/2012 | Johanson | F17C 5/02<br>62/51.1 |
| 2014/0091574 | A1 | 4/2014 | Favy | |
| 2023/0015757 | A1 * | 1/2023 | Li | F17C 13/04 |

* cited by examiner

1300

| Ref. | ENERGY SINKS | VAR. | EQUATIONS | Ref. | PRODUCTS/FEATURES ADDED TO MANIPULATE |
|---|---|---|---|---|---|
| 1306a | Enthalpy Gain of Liq. Phase | $\Delta H_L$ = | $\Delta U_L + \Delta P_S * V$ | 1306b | Large Volume of Low-VP Liquid Provides Stable Liquid Mass to Absorb Energy Over Time. |
| 1309a | Solvent Latent Heat of Vap. | $\Delta H_S$ = | $M_{SV2} * \lambda_S(p)$ | 1309b | A Soluble High-VP Liquid will Periodically Flash to Transfer the Absorbed Energy to the Vapor Phase. Varying the Boiling Points of the High-VP Liquids will Significantly Stabilize the Energy Transfer at the Phase Boundary. |
| 1312a | Latent Heat of Cond. Relief Vaps. | $\Delta H_R$ = | $M_{RV} * \lambda_R(p)$ | 1312b | Selecting the Proper Low-VP Liquid to Use Based on the Physical Properties of the Relief Material. |
| 1315a | Ambient Heat Losses | $\Delta H_A$ = | $U_O * A_S * ((T_2+T_1)/2 - T_{AMB})$ | 1315b | Additional Surface Area Added to Vessel Specifically for Maximixing Local Convective Losses. |
| 1318a | Vessel Mass Temperature Gain | $Q_{VS}$ = | $M_V * C_{P,AV} * (T_i - T_0)$ | 1318b | Vessel Material Properties Thickness Selection, Vessel Jacketing with Circulation to Enhance Convective Losses. |
| 1321a | Enthalpy Gain of Vapor Phase | $\Delta H_V$ = | $\Delta U_V + \Delta P * V$ | 1321b | at the Initial State, at Least One Compressible Gas Must Be Present to form a Stable Vacuum. in Moving toward the Final State of the Relief Event, the Vapor Phase Continuously Changes in Equilibrium Composition Moving from Lighter Components to Heavier Ones, which Slows and Stabilizes the Vessel Pressure. |
| 1324a | Vapor Phase Compression | $P_c$ = | $[\Upsilon Q_1 P_1 / (\Upsilon - 1)] [(P_2/P_1)^{((\Upsilon-1)/\Upsilon)}]$ | 1324b | Starting at the Lowest Arming Pressure to Provide Most Delta-p Between Initial And Final States. Filling Vapor Space With Gases that can Condense As they Pressurize, Automatically Minimizes Rate of Pressure Rise Allowing for Longer Relief Event Times. |
| 1327a | Emitted Acoustic Energy | $W_{p,i}$ = | $\Sigma\ 1/2 \mu_i \omega_i^2 v^2 \lambda_i$ | 1327b | Vessel is Constructed with Acoustic Dampening Elements to Prevent Resonance that Could Destabilize the System Mechanically. |
| 1330a | Radiation Loss | $P_{NET}$ = | $A \sigma \varepsilon (T^4 - T_0^4)$ | 1330b | |
| 1333a | Extra Sensible Loss Contributors | $\Delta H_x$ = | $M_V * C_{P,AV} * (T_O - T_I)$ | 1333b | Addition of Either Passive or Active Mechanical Elements, Such a Radiator Coil, or Forced-convection Fan Cooler will Extend Time to Reach Final State. |
| 1306 | **MATERIAL SINKS** | | | | |
| 1336a | Vapor Phase Densification | $\Delta M_v$ = | $V_{V2} * r_2 - V_{V1} * r_1$ | 1336b | Largely a Capacity Factor that is Determined from the Relief Event and Max. Safe Duration Allowed. See Basis for Sizing Examples in the Specification. |
| 1339a | Liquid Phase Densification | $\Delta M_L$ = | $L_{V2} * r_2 - L_{V1} * r_1$ | 1339b | |
| 1342a | Total Volumetric Capacity Available | $\Delta M_L$ = | $\pi * D_V^2 / 4 * (L_{MAX} - L_1)$ | 1342b | |
| 1345a | Direct Mass Transfers | $\Delta M_{RLF}$ = | var. | 1345b | The Embodiment where Accumulated Low-VP and Condensed Relief Liquids are Discharged from the Container while Ambient Fresh Low-VP Material is Added to Extend the Relief Capacity of the System. |

1303

FIG. 13

SYSTEM FOR EMERGENCY PRESSURE RELIEF AND VAPOR CAPTURE

CROSS REFERENCE TO RELATED APPLICATIONS

This application claims the benefit of U.S. Provisional Application No. 63/312,222, titled "Emergency Relief and Vapour Capture Process," filed on Feb. 21, 2022 for inventors Edward John Brost of Brights Grove, Ontario, Canada; and Gary Stewart Locke of Calgary, Alberta, Canada; by Applicant Carbovate Development Corp. of Sarnia, Ontario, Canada, the entire contents of which are incorporated herein by reference.

TECHNICAL FIELD

This disclosure relates generally to the field of process safety and specifically equipment overpressure protection.

BACKGROUND

Process equipment is apparatus used to process materials. Examples of process equipment include but not limited to vessels, tanks, containers, valves, pumps, and piping. Some process equipment may be used to process flammable and toxic as well as benign but flammable fluids and water. Some processes may operate at elevated pressures. In some scenarios, low pressure process equipment may be exposed to unacceptable over pressure conditions that present threats to people and/or equipment.

Some process equipment may be protected from over pressure conditions by a flare system. In an illustrative example, process material may be released from process equipment experiencing an over pressure condition, to relieve pressure from the equipment. The over pressure condition may be due to an unplanned or planned event. Such an event may be referred to as a relief event. A relief event may be a result of an over pressure condition that affects process equipment.

In some scenarios material released from a process due to a relief event may comprise gases and vapors. The released material may be referred to as a relief mass. In some scenarios the relief mass may be routed to the flare system via pressure relief valves or other over pressure protection devices and transported via a dedicated relief fluid piping system, referred to as a flare header. The flare may include a continuously burning pilot flame which may ignite the relieved material for combustion. Some flare systems may be supported by pilotless flares which have ignition systems to ignite the relieved material.

Process relief using flare systems may require additional equipment to control and optimize combustion reliability, with increased cost and complexity. Such flare systems may include numerous active sub-systems such as pilot and main burners, fuel gas controls, steam controls, purge gas controls, flame monitoring, gas/liquid separators, molecular seals, and gas analyzers. These active subsystems require substantial capital and operating cost.

SUMMARY

The invention relates to preloading a containment vessel with Low Vapor Pressure (LVP) liquid, partially evacuating the containment vessel to generate a vacuum in a headspace above the LVP liquid, and relieving material from a process vessel into the containment vessel during a process relief event in the process vessel. The process relief event may be a result of an overpressure event or a planned release event in the process vessel. The containment vessel pressure may be equalized with ambient conditions prior to preloading the LVP liquid. The containment vessel size and quantity of LVP liquid may be determined to absorb the energy and mass of relieving fluids from the maximum anticipated relief scenario, permitting the gases to condense back to liquid form to be recovered in a liquid state instead of atmospherically venting or combusting the gases. The containment vessel headspace may be partially filled with a High Vapor Pressure (HVP) liquid comprising C5-C10 hydrocarbons configured to flash during evacuation and enlarge and occupy the headspace to provide additional head space volume and heat rejection capacity while maintaining a vacuum in the headspace above the LVP liquid. The headspace vacuum may be created by pulling the HVP liquid out of the bottom of the liquid full sealed vessel, which creates a tiny headspace (due to LVP liquid's extremely low vapor pressure) and a deep vacuum. The head space volume will tend to be maintained as the relief event occurs as the HVP vapor condenses as the relief event occurs. Then, as discussed below, some of the vacuum may be lost when the HVP liquid is admitted to the vessel and flashes to create a larger head space but still under moderate vacuum. In an illustrative example an exemplary relief management process may have a strong self-regulating tendency as a result of the tendency for the head space volume to remain close to the same size as the HVP condenses.

The invention relates to configuring a high-vapor-pressure (HVP) material comprising a plurality of component hydrocarbons; flashing the HVP material from an HVP liquid to an HVP vapor as the HVP liquid is introduced into an evacuated portion of a containment vessel; introducing a relief mass from a process relief event occurring outside the containment vessel to mix with the HVP vapor in the containment vessel; and distributing energy from the process relief mass within the containment vessel using a plurality of energy absorption processes as the plurality of component hydrocarbons respectively condense to liquid phases over time. The evacuated portion of the containment vessel may be a headspace vacuum above a low-vapor-pressure (LVP) liquid within the containment vessel. The HVP material may comprise C4-C10 hydrocarbons. The HVP material may comprise a plurality of component hydrocarbons having diverse boiling points and vapor pressures, that absorb and distribute the relief mass energy. The containment vessel pressure in the evacuated portion of the containment vessel may be a pressure low enough to cause the HVP materials to evaporate within the containment vessel. The LVP liquid retained by the containment vessel may be used to generate and maintain the headspace vacuum and be available to absorb heat and partially dissolve a portion of the relieved material. In an illustrative example the HVP liquid may be introduced into a containment vessel below the surface of LVP liquid. The HVP liquid introduced below the surface of LVP liquid would still flash however the HVP liquid would take more time to flash. An exemplary nozzle used to introduce HVP material into a containment vessel may be disposed at an elevation higher or lower than a level of LVP liquid in the containment vessel.

An implementation in accordance with the present disclosure may present an alternative to a flare for process relief. In an illustrative example, relieving vapors may be routed to a sealed and evacuated containment vessel. The containment vessel may be preloaded with other materials configured to absorb the energy of the relieving fluids and allow the gases and vapors to condense back to liquid form. The gases and vapors may condense back to liquid form within the containment vessel. Allowing gases from the relieving fluids to condense back to liquid form may permit the relieving fluids to be recovered in liquid form instead of being combusted. The recovered liquids within the containment vessel may be returned to the process after the relief event subsides instead of being vented to the atmosphere as products of combustion. By eliminating the need for active combustion control subsystems required for a typical flare, substantial capital and operating costs savings may be achieved for processes that produce relief vapors that are condensable at low pressures.

An implementation in accordance with the present disclosure may achieve one or more technical effect. For example, some implementations may reduce the release of harmful materials such as greenhouse gases to the atmosphere. Such reduced release of harmful materials may be a result of a pressure relief implementation designed to avoid venting process relief material or combustion products to the atmosphere, based on recovering relieved material in a liquid state. Some implementations may reduce operating or maintenance cost of a pressure relief system. Such reduced operating or maintenance cost may be a result of a pressure relief system designed with fewer components to deploy and maintain than a flare system. Some designs may enhance process relief capacity. Such enhanced process relief capacity may be a result of a process relief management system designed to use a vacuum in a containment vessel operating in a passive state, to enhance the containment vessel relief capacity and/or reliability during an active process relief event.

Some implementations may eliminate the release of harmful or dangerous materials. Such eliminated release of harmful or dangerous materials may be a result of a relief management system designed to completely contain all materials relieved from a relief event, based on using an evacuated sealed space that is sufficiently large enough to contain the volumes and conditions of all relieved materials that could reasonably be expected from the process during the relief event. Some implementations may increase process relief reliability. Such increased process relief reliability may be a result of a relief management system designed to operate without pumps, motors or other active components during a relief event, based on using a relief system comprising an evacuated system under vacuum pressure low enough relative to the protected system's pressure to passively provide the motive force to transfer the relieved fluids to the evacuated sealed space. Various designs may improve process efficiency. Such improved efficiency may be a result of a pressure relief implementation designed to permit returning recovered liquids within a containment vessel to a process instead of being released to the atmosphere as products of combustion. For example, fluids captured by the containment vessel may be recovered and recycled to a process protected by an exemplary relief management system, permitting the relief management system to be rapidly reset for service.

Some designs may improve relief management system efficiency. Such improved relief management system efficiency may be a result of distributing energy from a process relief mass over time within the containment vessel to a plurality of energy absorption processes, based on configuring an HVP material implementation comprising a plurality of materials such as hydrocarbons and using the plurality of hydrocarbons in a respective plurality of energy absorption processes as the plurality of component hydrocarbons respectively condense to liquid phases within the containment vessel. The HVP material implementation may consist of materials that are not defined as hydrocarbons. For example, the HVP material implementation consisting of materials that are not defined as hydrocarbons may comprise alcohols, aldehydes, ketones, or some inorganic materials including water, depending on the nature of the process. Distributing energy from the process relief mass over time within the containment vessel using HVP material comprising a plurality of hydrocarbons in a respective plurality of energy absorption processes may provide additional heat absorption or rejection capacity, improving the utilization of containment vessel useable volume. In an illustrative example although the containment vessel physical volume may be fixed, the containment vessel useable volume is maintained (at least directionally) as the HVP material condenses from vapor to liquid as the containment vessel pressure rises due to ingress of the relieved material which also tends to condense as the containment vessel pressure rises toward flare header pressure. For example at small scales, an HVP material implementation configured with a plurality of hydrocarbons selected and mixed to enhance ambient heat leakage and containment mass might be preferred over enhancing total volumetric capacity. However at larger scales, increasing the plurality of high-boiling species and total volume available in a different HVP material implementation may be more important to the ultimate thermal capacity. Some designs may improve relief management system readiness. Such improved relief management system readiness may be a result of a containment vessel preloaded with an LVP liquid used to generate and maintain a headspace vacuum above the LVP liquid in the containment vessel. Generating and maintaining the headspace vacuum above the LVP liquid may permit the HVP material to flash in the headspace to an HVP vapor increasing the headspace volume while still being under vacuum that is ready before a relief event to absorb additional energy from a process relief mass using a plurality of energy absorption processes as the plurality of component hydrocarbons of the HVP vapor respectively condense to liquid phases over time within the containment vessel.

BRIEF DESCRIPTION OF THE DRAWINGS

FIG. 13 depicts exemplary models of physics variables that may be measured, manipulated or enhanced to govern the operation of various implementations.

DETAILED DESCRIPTION OF EXEMPLARY IMPLEMENTATIONS

The detailed description explains exemplary embodiments of the present invention, together with advantages and features, by way of example with reference to the drawings, in which similar numbers refer to similar parts throughout the drawings. Any schematics, charts or flow diagrams depicted or process descriptions disclosed herein are examples. There may be many variations to these diagrams or descriptions, or the steps (or operations) described therein without departing from the spirit of the invention. For instance, the steps may be performed in a differing order, or steps may be added, deleted, or modified. All these variations are considered to be within the scope of the claimed invention. Like reference symbols in the various drawings indicate like elements.

Figure 1:
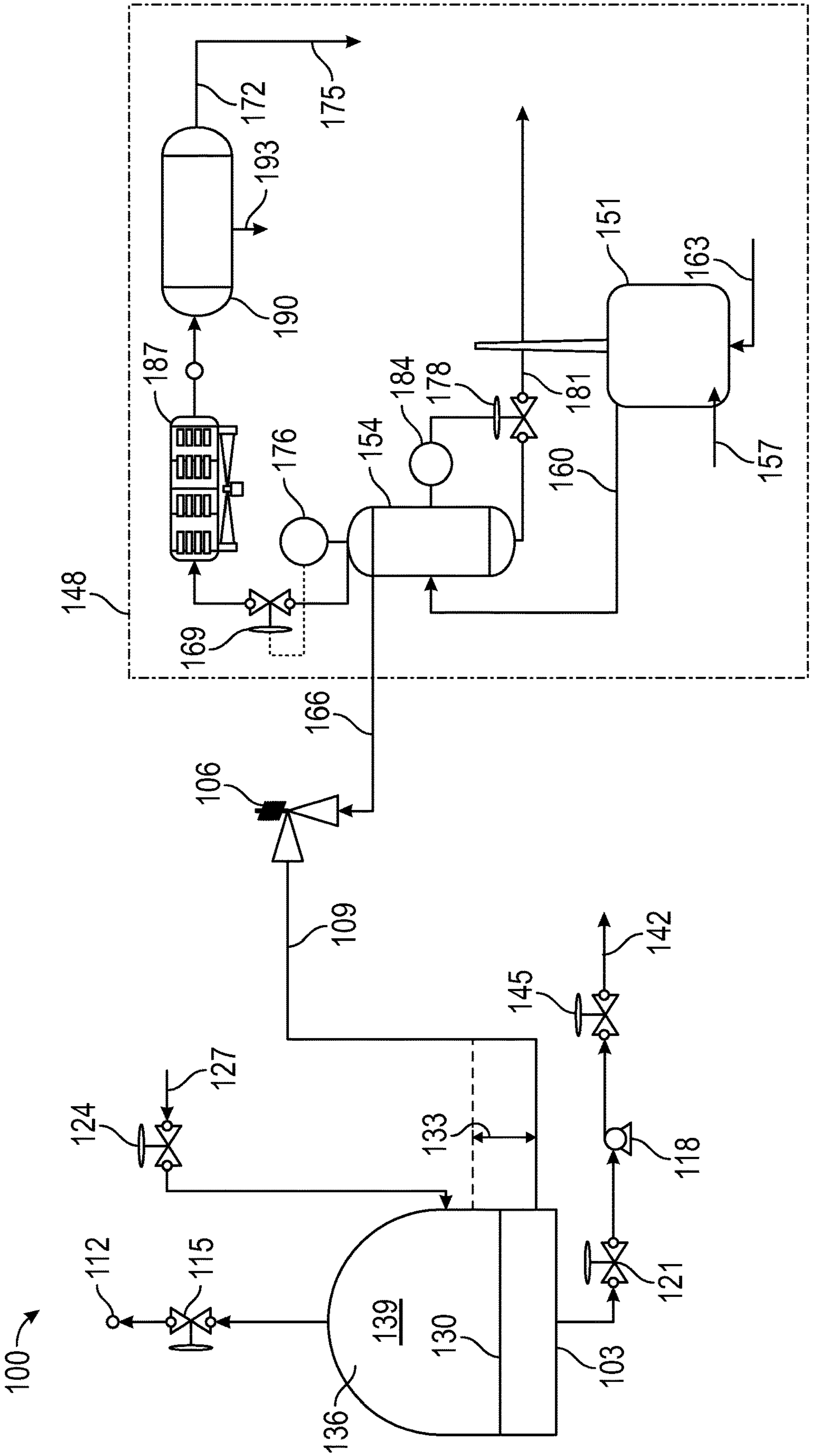
FIG. 1 depicts a schematic view of an exemplary relief management system implementation comprising a sealed and evacuated containment vessel preloaded with a low-vapor-pressure (LVP) liquid at initial conditions and connected to an exemplary process relief device (PRD).

FIG. 1 depicts a schematic view of an exemplary relief management system implementation comprising a sealed and evacuated containment vessel preloaded with a low-vapor-pressure (LVP) liquid at initial conditions and connected to an exemplary process relief device (PRD). In FIG. 1 the relief management system 100 comprises the containment vessel 103. The containment vessel 103 is operably coupled with the process relief device (PRD) 106. The PRD 106 outlet is connected through the sealed relief header 109 in fluid communication with the containment vessel 103. In the depicted implementation the vent 112 is in fluid communication with the vent valve 115. In the depicted implementation the vent valve 115 may be open or closed. In the depicted implementation the vent valve 115 is configured to fluidly couple the containment vessel 103 with the atmosphere through the vent 112 when the vent valve is open. In the depicted implementation the vent valve 115 is configured to seal the containment vessel 103 from the atmosphere when the vent valve 115 is closed.

In the implementation depicted by FIG. 1 the draw pump 118 is in fluid communication with the drain valve 121. In the depicted implementation the drain valve 121 may be open or closed. In the depicted implementation the drain valve 121 is configured to fluidly couple the containment vessel 103 with the draw pump 118 when the drain valve 121 is open. In the depicted implementation the drain valve 121 is configured to seal the containment vessel 103 from the draw pump 118 when the drain valve 121 is closed. In the depicted implementation the draw pump 118 may be activated or stopped.

In the implementation depicted by FIG. 1 the low-vapor-pressure (LVP) liquid fill valve 124 is configured to be opened to fluidly couple the containment vessel 103 with the LVP liquid source 127. In the depicted implementation the LVP liquid fill valve 124 is configured to seal the containment vessel 103 from the LVP liquid source 127 when the LVP liquid fill valve 124 is closed. The LVP liquid fill valve 124 may be opened to introduce LVP liquid from the LVP liquid source 127 into the containment vessel 103.

With continuing reference to FIG. 1 the containment vessel 103 may be prepared for service based on preloading the containment vessel 103 with material. The containment vessel 103 may be preloaded with LVP material. Prior to placing the containment vessel 103 into service, the containment vessel 103 pressure may be equalized with ambient conditions by opening the vent valve 115. The containment vessel 103 may then be fully filled with LVP liquid from the LVP liquid source 127 using the LVP liquid fill valve 124. When the containment vessel 103 is fully filled with LVP liquid, the vent valve 115 is closed and the LVP liquid level in the containment vessel 103 is drawn down by the draw pump 118 using the drain valve 121. The vent valve 115 remains closed as the LVP liquid inventory 130 within the containment vessel 103 is withdrawn. The outlet elevation of the PRD 106 may be maintained at a higher elevation than the containment vessel 103 so that liquids from the containment vessel 103 cannot flow backward to the PRD 106. When liquid is present in the containment vessel 103, this elevation difference between the containment vessel 103 and the PRD 106 outlet forms the seal leg 133 in the relief header 109. As the LVP liquid inventory 130 within the containment vessel 103 is withdrawn, the headspace 136 will form above the LVP liquid level in the containment vessel 103 and the headspace vacuum 139 will form in the headspace 136. In an illustrative example the headspace 136 is a volume that is a portion of the containment vessel 103 volume. The headspace 136 volume may be under vacuum pressure from the headspace vacuum 139. In the depicted implementation the LVP liquid has virtually no measurable vapor pressure. The low vapor pressure of the LVP liquid at ambient or similar temperatures for which the system is designed prevents the LVP liquid from flashing to vapors in the containment vessel 103 headspace 136. Note that the LVP liquid vapor pressure would increase if the temperature were increased to temperatures far above any reasonable operating pressure, such as hundreds of degrees C. in an illustrative example scenario. The low vapor pressure of the LVP liquid that prevents the LVP liquid from flashing to vapors in the containment vessel 103 headspace 136 also prevents the headspace 136 from filling with flashed vapors as the LVP liquid is pumped out of the containment vessel 103. In the depicted implementation the vacuum pressure in the headspace 136 will increase as the LVP liquid level in the containment vessel 103 decreases. The vacuum pressure in the headspace 136 may increase to a very high level. The LVP liquid pumped out of the containment vessel 103 may be recovered in a transfer tank using the LVP liquid transfer outlet 142 and the LVP liquid transfer valve 145.

When the desired level of headspace vacuum pressure is reached, the draw pump 118 is stopped and the drain valve 121 is closed. The LVP liquid level in the containment vessel 103 is higher than the elevation level at which the relief header 109 connects to the containment vessel 103. The volume of LVP liquid that flows from the containment vessel 103 into the relief header 109 and equalizes with the level of LVP liquid in the containment vessel 103 forms the seal-leg 133. The containment vessel 103 is then ready for service.

With continuing reference to FIG. 1 the depicted relief management system 100 further comprises the processing unit 148. The processing unit 148 may be a generic hydrocarbon processing unit. The processing unit 148 may be part of an integrated hydrocarbon processing unit. In the depicted implementation the processing unit 148 comprises the heater 151. In the depicted implementation the heater 151 is a fuel-fired heater. The heater 151 may be, for example, an electric heater, or a heater using hot fluids from some other part of an exemplary process or plant. The heater 151 may be any heat source configured to inject energy into the process. In the depicted implementation the processing unit 148 further comprises the process vessel 154. In the depicted implementation the fired heater 151 receives the feed 157 comprising incoming liquid hydrocarbon material from storage or other upstream equipment. In the depicted implementation the fired heater 151 heats the feed 157. The heated feed material exits the fired heater 151 through the heater process outlet 160. In the depicted example the feed 157 is heated by the fired heater 151 using fuel supplied to the heater fuel inlet 163. The heated feed material from the heater process outlet 160 flows into the process vessel 154. In the depicted implementation the process vessel 154 has a maximum allowable work pressure (MAWP), which is protected by the normally closed PRD 106 in fluid communication with the process vessel 154 through the sealed conduit 166.

In an illustrative example the processing unit 148 may comprise functional units configured to implement an exemplary process in collaboration with the process vessel 154. All such functional units configured to implement an exemplary process using the processing unit 148 may be considered as protected from overpressure by the process relief system 100. The process vessel 154 and the functional units comprising the processing unit 148 may be configured to implement an exemplary process wherein something other than a combustible fuel may be a source of energy input.

For example the depicted processing unit 148 includes the process control valve 169 configured to govern material flow to the product outlet 172. The material flow from the product outlet comprises the product 175. In the depicted example the pressure within the process vessel 154 may be determined using the product pressure indicator for process pressure control (PC) 176. In the depicted example the processing unit 148 also includes exemplary by-product composition control (LC) valve 178 configured to govern composition of a by-product stream through the by-product outlet 181. In some examples the composition of the by-product stream may be adjusted using the LC valve 178 based on a composition measurement from the by-product composition indicator 184. In an illustrative example the processing unit 148 may comprise a reactor 187, a separator 190, a phase separation drum or a distillation column operably coupled with the process vessel 154. In some examples one or more by-products may comprise wastewater 193.

In continuing reference to FIG. 1 the containment vessel 103 may be located a safe distance away from the processing unit 148 such that any scenario in the processing unit 148 that might cause the PRD 106 to relieve material will not be a scenario that also affects or compromises the containment vessel 103 (such as a localized process fire). Prior to starting the processing unit 148, the containment vessel 103 may be preloaded with LVP liquid in line with what has been described herein, to prepare the processing unit 148 for service with over pressure protection provided by the containment vessel 103. When the processing unit 148 is in normal operation, the containment vessel 103 is sealed and all of the inlet and outlet valves are closed. A typical relief scenario where the PRD 106 may relieve material from the process vessel 154 into the sealed relief header 109 may occur when a pressure valve mis-operates. The root cause of a relief scenario may be more than one specific action, but the net process effect is that the process vessel 154 is "blocked-in" and the heater 151 continues to input heat into the system. Under this scenario, the pressure inside the process vessel 154 will quickly climb to the MAWP. In an illustrative example the PRD 106 may be considered as a process relief valve that is kept normally closed by the force of an internal spring opposing the pressure inside the process vessel 154. In this example when the pressure force inside the process vessel 154 exceeds the resisting force of the spring, the process relief valve will open and allow material to flow out of the process vessel 154 and into the sealed relief header 109. The PRD 106 may comprise a spring-loaded pressure safety valve (PSV). The PRD 106 may comprise a pilot-operated PSV. When the causes of the relief scenario are remedied and the process vessel 154 returns to normal operating pressure, the PRD 106 will automatically close and cease allowing material to flow into the sealed relief header 109. For example in the case of a spring-loaded PRD, the internal PRD spring will automatically close and stop permitting material flow into the sealed relief header 109. In an exemplary relief scenario, material exiting the PRD 106 and flowing through the sealed relief header 109 toward the containment vessel 103 may be a hot vapor stream because the sealed relief header 109 would be at a lower pressure than the process vessel 154.

In continuing reference to FIG. 1 hot vapors entering the sealed relief header 109 flow toward the containment vessel 103 due to the pressure gradient between the process vessel 154 and the containment vessel 103. As the hot vapors flow through the liquid material in the seal leg 133 and the containment vessel 103, the preloaded LVP liquid absorbs the thermal energy from the hot relieving vapors which cools and condenses the relieving vapors. In an illustrative example the minimum mass of the LVP liquid maintained within the containment vessel 103 while the process is operating may be such a mass of LVP liquid that has been determined to be able to absorb and condense the maximum mass of relief vapors entering the system. Therefore, once all of the process vapor relief sizing cases are calculated (including normal allowances for load-mitigation measures), the largest relief scenario (for example a power-failure, or pool-fire) may determine the size of the containment vessel 103 and quantity of LVP liquid contained therein (for example the LVP liquid inventory 130, depicted at least by FIGS. 1-3) plus a safety margin. Some additional system absorption/condensation capacity of the containment vessel 103 may occur by allowing the containment vessel 103 pressure to increase to the maximum allowable backpressure of any pressure safety valve (PSV) or process relief device (PRD) connected to the sealed relief header 109. The maximum containment vessel 103 working pressure may be less than 1,515 mmHg(a), which would not qualify the containment vessel 103 as subject to the rules and regulations of any "Pressure Vessel Code." In an illustrative example the containment vessel 103 and relief management system 100 may be designed to implement a maximum containment vessel 103 working pressure less than a particular pressure vessel code enforced within a specific jurisdiction or region.

Once all of the process relief contingencies are analyzed and PRD sized to safely manage these contingencies, an exemplary procedure for calculating the minimum residual mass of the LVP liquid inventory 130 in an exemplary containment vessel 103 when in service may be determined as follows:

Select which relief scenarios generate the highest thermal mass rate of vapor from the process (peak relief rate).

At the relief conditions, calculate the steady-state rate of ambient LVP liquid such that a single stage flash produces no residual vapor (i.e., all vapor is condensed and absorbed by the liquid).

Example: 9,873 kg/hr of vapor @ 180° F. mixing with 32,575 kg/hr produces no residual vapor at 1,515 mmHg (a). This equates to 3.3 kg LVP liquid per kg of relief vapor.

Estimate the maximum reasonable duration of the relief event at peak relief loads or the maximum stored inventory of relieving material inside the relieving vessel (whichever is largest).

Example: Process inventory in relieving vessel is 500 kg or average duration at peak relief rate is 3 minutes until inventory is emptied, contingency mitigation measures are implemented and the mass flow rate through the PRD falls to near zero.

Multiply the estimated total process mass relieved through the PRD times the vapor absorption factor determined earlier.

Example: 500 kg*3.3 kg liquid/kg Vapor=1,650 kg LVP liquid (~12 bbls)

Multiply the calculated minimum mass sponge oil mass by safety design factor.

Example 12 bbls*1.5=18 bbls or 750 gals or ~2.8 $m^3$

In this exemplary procedure for calculating the minimum residual mass of the LVP liquid inventory 130 in an exemplary containment vessel 103 when in service, the remaining volume of the containment vessel 103 is headspace 136 above the static LVP liquid inventory 130. The headspace volume may be greater than the total volume of the process equipment being protected by the PRD.

Figure 2:
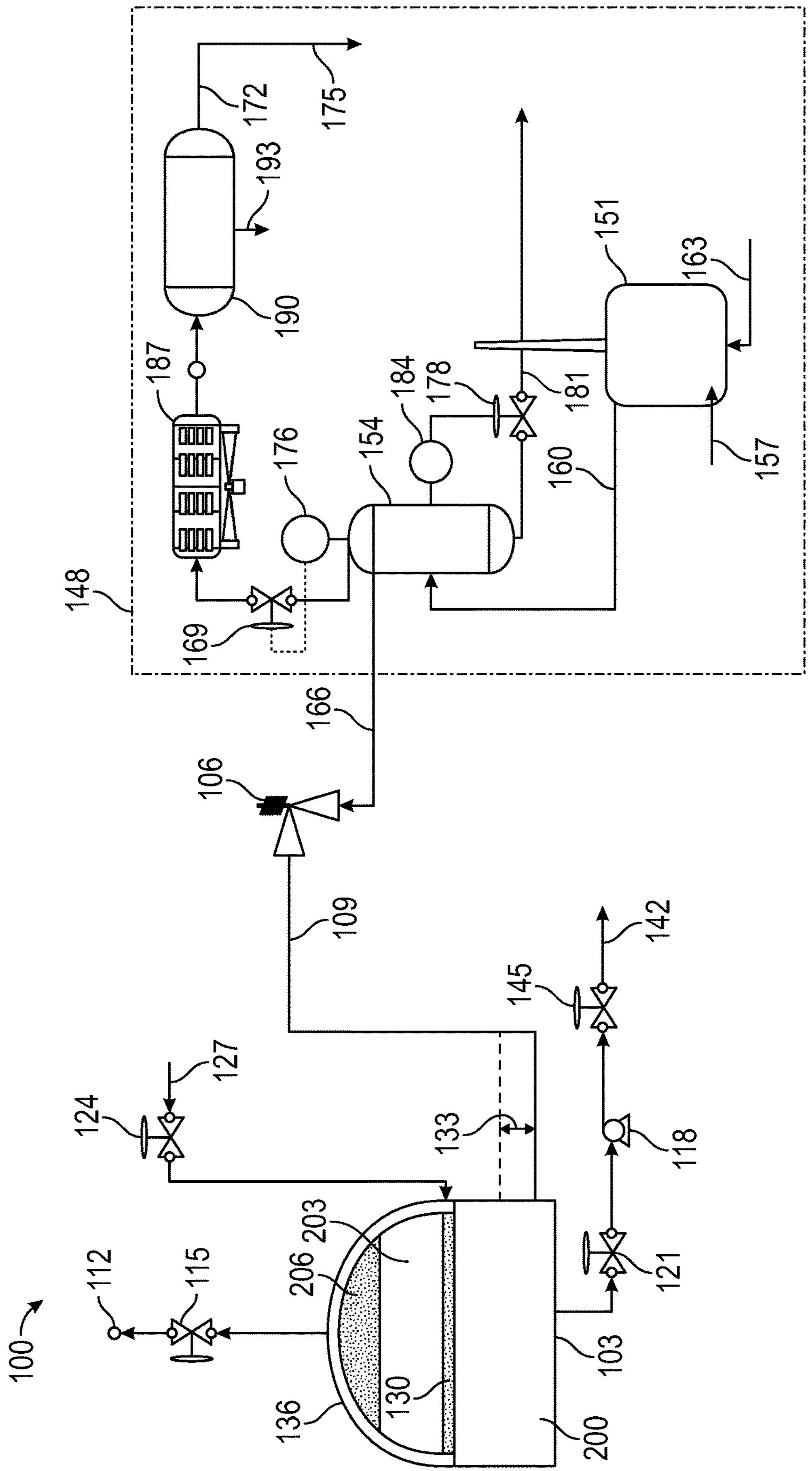
FIG. 2 depicts a schematic view of the exemplary relief management system implementation of FIG. 1 at static conditions after a relief event showing the containment vessel having an increased liquid level and a headspace at higher pressure with any uncondensed vapors.

FIG. 2 depicts a schematic view of the exemplary relief management system implementation of FIG. 1 at static conditions after a relief event showing the containment vessel having an increased liquid level and a headspace at higher pressure with any uncondensed vapors. In FIG. 2 the exemplary relief management system 100 is shown in an exemplary static state after an exemplary relief event has subsided. The LVP liquid inventory 130 within the containment vessel 103 has been heated by the incoming hot vapor from the PRD 106. The heated LVP liquid inventory 130 is the LVP Liquid Phase and Condensed PRD Vapors 200 depicted by FIG. 2. The LVP Liquid Phase and Condensed PRD Vapors 200 has been heated but is not vaporized since the sensible heat capacity of the mass inside the containment vessel 103 is greater than the thermal mass vented from the process, by design. Moreover, because the vapor pressure of LVP liquid is nearly zero, extremely high temperatures would be required for the LVP liquid within the containment vessel 103 to enter a vapor state. The liquid volume of the LVP liquid comprising the LVP Liquid Phase and Condensed PRD Vapors 200 within the containment vessel 103 has increased, reflecting the absorption of PRD vapors that are condensed as they bubble up through the cooler LVP liquid. As the vapors condense, the warm PRD vapors at containment vessel Maximum Allowable Working Pressure (MAWP) 203 (depicted by FIG. 2) will form within the containment vessel 103 above the LVP liquid comprising the LVP Liquid Phase and Condensed PRD Vapors 200. PRD vapors not initially condensed by contact with the LVP liquid may condense directly from the headspace 136 as the pressure inside the containment vessel 103 begins to elevate. The headspace 136 will contain any residual PRD vapors in equilibrium with the final temperature of the LVP liquid phase and the MAWP of the containment vessel 103, depicted by FIG. 2 as residual PRD vapors in equilibrium with final temperature 206. For example, at 1,515 mmHg(a) pressure, n-pentane has a bubble point temperature of around 36° C. Consequently, if the LVP bulk temperature is maintained below 36° C., n-pentane will be in the liquid phase and remain dissolved within the LVP mass. Only above 36° C. will the temperature be high enough for n-pentane to begin raising the pressure inside the headspace 136. For n-hexane, the maximum LVP liquid phase temperature increases to 69° C. As the hydrocarbon molecular weight of the relieving hot vapor increases, the containment system's maximum heat absorption capacity also increases. Moreover, as the relief vapor molecular weight increases, the hydrocarbon vapor pressure decreases, which further increases the capacity of the system to safely contain the relief event. These technical effects make exemplary implementations particularly suited to hydrocarbon processing units that do not contain appreciable amounts of n-butane or lighter hydrocarbons in their feedstock.

Figure 3:
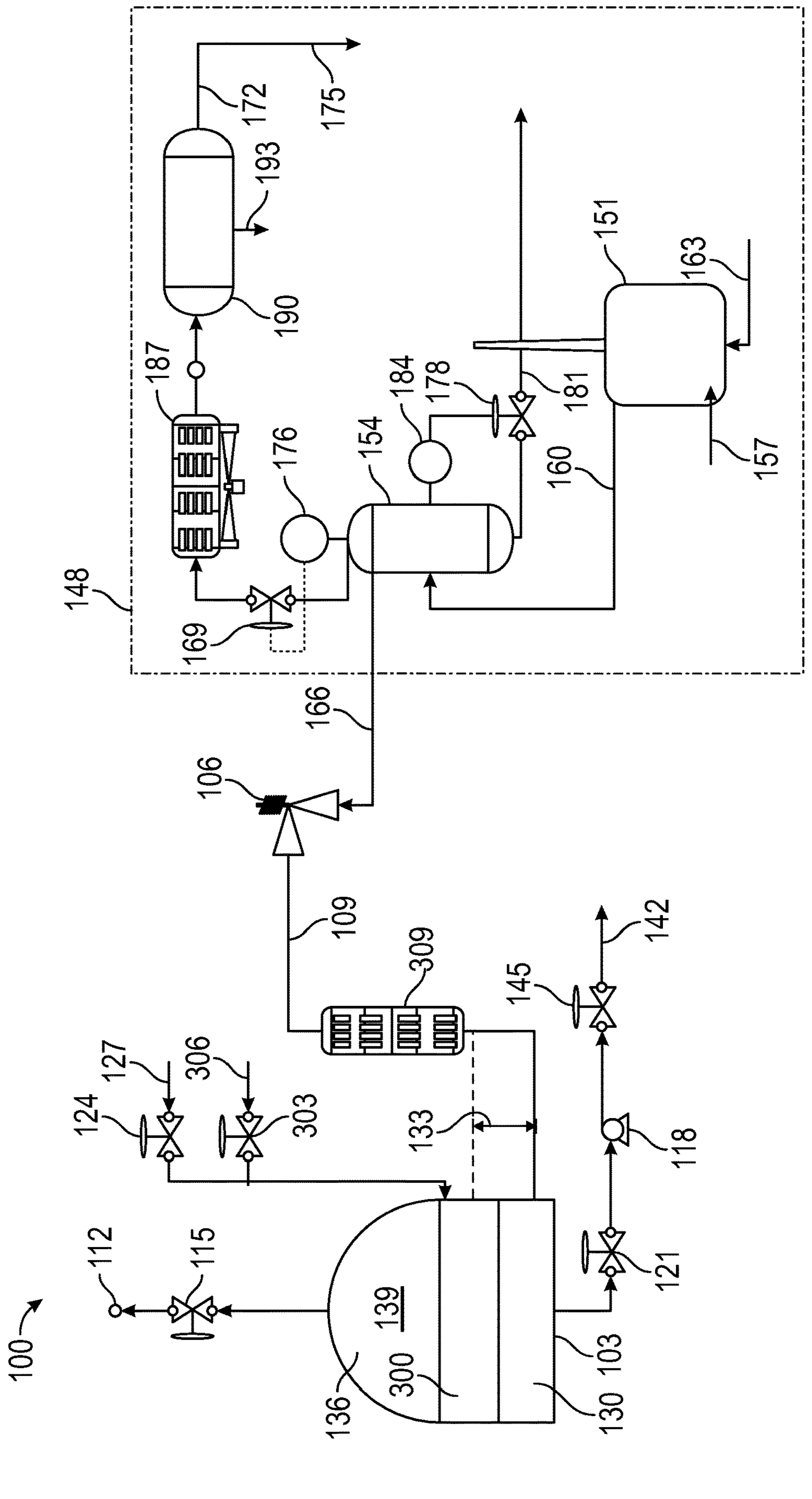
FIG. 3 depicts a schematic view of an exemplary relief management system implementation comprising a heat removal system such as a radiator coil and a connection to introduce a high-vapor-pressure (HVP) liquid into the containment vessel that flashes during evacuation and occupies the headspace to provide additional heat rejection capacity.

FIG. 3 depicts a schematic view of an exemplary relief management system implementation comprising a radiator coil and a connection to introduce a high-vapor-pressure (HVP) liquid into the containment vessel that flashes during evacuation that increase the headspace volume and occupies the headspace to provide additional heat rejection capacity and volume. In FIG. 3 the headspace 136 of the evacuated containment vessel 103 is partially filled with a high-vapor pressure (HVP) material 300. The HVP material 300 may comprise liquid. The HVP material 300 may comprise a plurality of hydrocarbons. The HVP material 300 may comprise C5-C6 hydrocarbons. The HVP material 300 may consist of material that does not comprise hydrocarbons. The HVP 300 material that does not comprise hydrocarbons may comprise other HVP liquids such as alcohols, aldehydes, ketones, inorganic liquids, or water. The HVP material 300 may comprise C4-C10 hydrocarbons. The HVP material 300 may comprise at least two hydrocarbons selected from any of C4, C5, C6, C7, C8, C9 or C10. The containment vessel 103 may be partially filled with the HVP material 300 by introducing the HVP material into the containment vessel 103 during an exemplary initial fill operation. The containment vessel 103 may be partially filled with the HVP material 300 by introducing the HVP material 300 into the containment vessel 103 after an exemplary evacuation operation. The evacuation operation may be a partial evacuation. In the implementation depicted by FIG. 3 the HVP liquid fill valve 303 is configured to permit introducing HVP material 300 into the containment vessel 103 from the HVP liquid source 306. As the HVP material 300 is introduced into the evacuated containment vessel 103, the HVP material 300 may flash into a vapor phase and cause the containment vessel 103 pressure to begin rising to toward ambient pressure while remaining under vacuum. The containment vessel 103 pressure may rise to toward ambient pressure while remaining under modest vacuum. The residual level of vacuum may still be deep vacuum. The deeper the vacuum the greater will be the driving force causing relieved material to flow from process vessel 154 via PRD 106 to a recovery vessel. In an illustrative example the static containment vessel 103 pressure after initial evacuation of the LVP liquid to the normal liquid level (NLL) will be proportional to the quantity of HVP material 300 added and partly dependent on ambient temperature. In an illustrative example when a process relief event occurs and the relief material enters the containment vessel 103, the pressure within the containment vessel 103 will rise and the vaporized HVP material 300 in the containment vessel 103 headspace 136 will begin condensing and as a result tend to sustain the head space volume for occupation by relieved material.

An exemplary pressure-condensation implementation using HVP material 300 disclosed herein may provide an exemplary containment vessel 103 implementation with additional heat absorption capacity. The additional heat absorption capacity added to the containment vessel 103 by the HVP material 300 may permit more efficient utilization of containment vessel 103 capacity and may increase the amount of energy that can be absorbed from a relief event, increasing safety margins and reducing equipment and material cost. In an illustrative example the additional heat absorption capacity added to an exemplary containment vessel 103 implementation according to the present disclosure may be equivalent to the "latent heat" of HVP material 300 added to the containment vessel 103. For example, if a 50/50 mixture of isopentane and n-pentane comprised the HVP material 300, and the containment vessel 103 initial pressure was drawn down to 9.7 psia, the HVP material 300 would occupy most of the vapor space at 80° F. as a vapor at ambient conditions. At these initial conditions, if a relief event occurred and the containment vessel 103 pressure increased to 29.7 psia, most of the HVP material 300 would condense back into a liquid phase and absorb an additional 123 btu/lb of heat from the relieving vapor mass. This extra heat absorption capacity is in addition to the sensible heat absorption capacity of the LVP liquid inventory 130 within the containment vessel 103. In the implementation depicted by FIG. 3, the sealed relief header 109 flows toward the containment vessel 103 through the radiator coil vapor cooler 309 to add additional heat rejection capacity to the containment vessel 103.

The HVP material 300 may comprise compounds having range of normal boiling points, such as C5 to C10 hydrocarbons that are completely soluble in the LVP liquid inventory 130. In an illustrative example these compounds have normal boiling points between 38-105° C. at ambient pressure. When a relief event occurs, as the evacuated containment vessel 103 begins receiving hot relief vapor from the PRD 106, the LVP liquid phase temperature will begin to rise. The lighter-boiling fractions of the HVP material will begin to vaporize into the headspace 136 of the containment vessel 103, causing the containment vessel 103 pressure to begin rising and LVP liquid phase temperature to rise at a slower rate. As the containment vessel 103 pressure continues to rise, pressure-condensation of the lighter boiling compounds slows the rate of the pressure rise. As LVP liquid temperature within the containment vessel 103 continues to rise, the system pressure begins to condense the higher boiling compounds within the added HVP material 300. If the HVP material 300 contains n-pentane, the containment vessel 103 LVP oil may condense relief vapors up to around 60° C. before the containment vessel 103 pressure reaches 15 psig. HVP liquid may be referred to as sponge oil. For n-Hexane, temperatures can be as high as 93° C. before the containment vessel 103 pressure reaches 15 psig.

The containment vessel 103 pressure rise during an exemplary relief event may be controlled by pumping a portion of the heated LVP liquid inventory 130 to an exemplary liquid transfer tank using the LVP liquid transfer outlet 142 and the LVP liquid transfer valve 145.

Fresh LVP liquid initially at ambient conditions may be added to the containment vessel 103 during a relief event. In an illustrative example fresh LVP liquid to be added to the containment vessel 103 may be stored in an exemplary LVP liquid storage vessel separate from the containment vessel 103. Adding LVP liquid initially at ambient conditions to the containment vessel 103 during a relief event may replace any heated LVP liquid inventory 130 transferred out of the containment vessel 103. Replacing heated LVP liquid inventory 130 transferred out of the containment vessel 103 may help to maintain system pressure below maximum allowable operating pressure. In illustrative examples controlling the containment vessel 103 pressure rise during an exemplary relief event using a portion of the heated LVP liquid inventory 130, or adding fresh LVP liquid initially at ambient conditions, may be implemented as passive operations using LVP storage tanks. The additional LVP material may be transferred to a storage tank that is below the liquid level via a relief valve set to open at ~1.515 mmHg. The LVP material may be stored at a slight elevation such that at ~1.515 mmHg material could be drawn from a second storage tank above the liquid level in the containment vessel 103. Such an implementation may provide a passive operation adding significantly to the capacity of the system to absorb material from a relief event.

Figure 4:
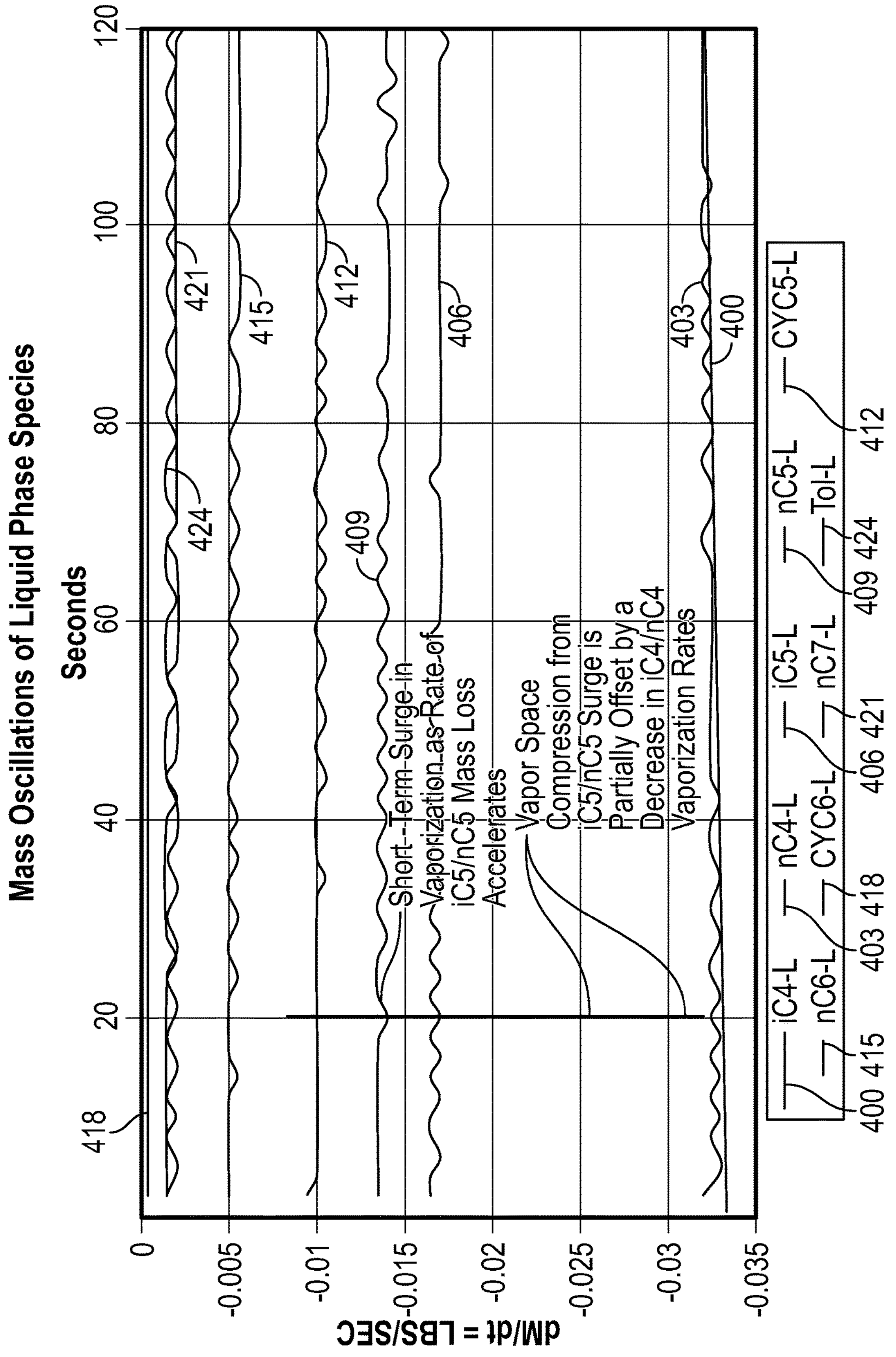
FIG. 4 depicts a chart view of mass change data illustrating exemplary mass oscillations of liquid phase species over time.

FIG. 4 depicts a chart view of mass change data illustrating exemplary mass oscillations of liquid phase species over time. In FIG. 4, the vertical axis represents delta changes in mass (M) between liquid and vapor with respect to time (t), dM/dt in units of LBS/SEC, and the horizontal axis represents time in units of Seconds. The mass change data charted by FIG. 4 illustrate change in mass with respect to time for iC4-L 400, nC4-L 403, iC5-L 406, nC5-L 409, CYC5-L 412, nC6-L 415, CYC6-L 418, nC7-L 421 and Tol-L 424. In FIGS. 4 and 6-12 plots designated with a label that includes an "L" represent a liquid (e.g. iC4-L 400 in FIG. 4) and plots designated with a label that includes a "V" represent a vapor (e.g. iC5-V in FIG. 6). The mass oscillations depicted by FIG. 4 show each species of a multi-component design comprising a plurality of species vaporizes and condenses on a pathway that is substantially unique with respect to the other species. For example, some patterns may be similar between species, but each species tends to either vaporize or condense at their unique rate. In an illustrative example, the directions of "humps" in the mass oscillations illustrated by FIG. 4 show the net evaporation or condensation of each species. In the mass oscillation data charted by FIG. 4, a "hump" pointing up (a local peak or maximum) is net evaporation and a "hump" pointing down (a local valley or minimum) is net condensation. The net effect for a multi-component design is that the heat absorbed by the liquid mass is distributed to the vapor phase more evenly in a plurality of energy absorption processes over time for a multi-component mixture and not in sudden surges as with a single or dual compound. In the example depicted by FIG. 4 the iC5/nC5 surge is partially offset by a decrease in iC4/nC4 vaporization rate. In the example depicted by FIG. 4 the short-term surge in vaporization as the rate of iC5/nC5 mass loss accelerates substantially coincides in time with the decrease in iC4/nC4 vaporization rate that partially offsets the vapor space compression from the iC5/nC5 surge.

Figure 5:
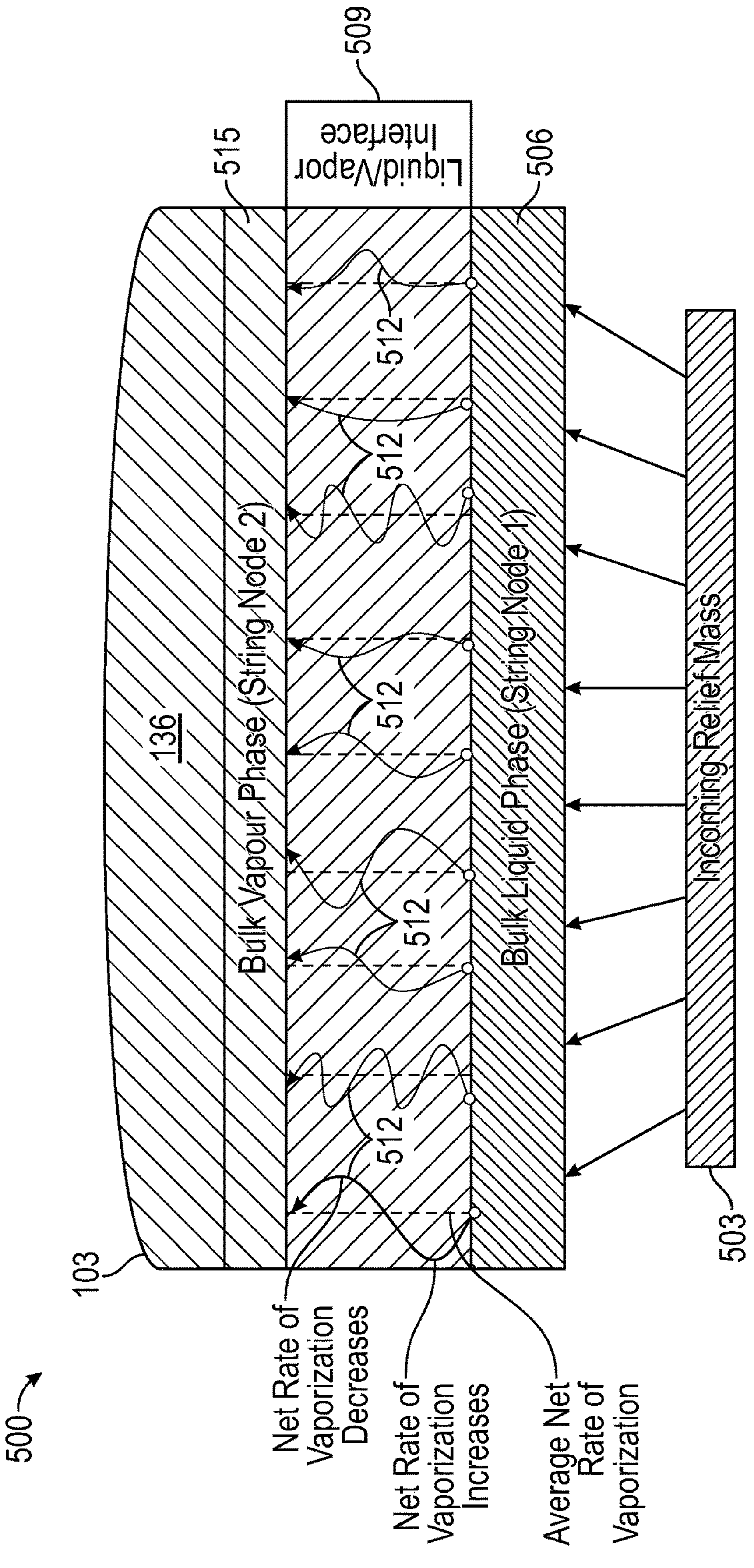
FIG. 5 depicts a visualization of an exemplary model of energy dissipation potential via kinetic mass oscillations at an exemplary containment vessel liquid/vapor interface.

FIG. 5 depicts a visualization of an exemplary model of energy dissipation potential via kinetic mass oscillations at an exemplary containment vessel liquid/vapor interface. In FIG. 5 the exemplary containment vessel model 500 visualization depicts enthalpy dissipation involving the kinetic/potential energy exchange of a multi-component mixture of a plurality of species modeled by a respective plurality of exemplary mass and spring models. In the example depicted by FIG. 5 the containment vessel model 500 comprises the process relief mass 503 incoming to the containment vessel 103. The bulk liquid phase (string node 1) 506 representing the incoming enthalpy of the relief mass 503 binds each individual component species at the first end of the liquid/vapor interface 509. In the depicted example each individual component species is modeled by an energy absorption process/string model 512. In the depicted example each individual component species is bound at the second end of the liquid/vapor interface 509 by the bulk vapor phase (string node 2) 515. In an illustrative example the "strings" here are defined as modeling the individual component species bound on one end by the incoming enthalpy of the relief mass and on the other end by a "spring," represented by the ever-compressing vapor space within the containment vessel 103. The "oscillating mass" here is the net movement of a quantity from vapor to liquid and liquid to vapor. The depicted containment vessel model 500 demonstrates that multi-component mixtures, with distributed and diverse boiling points between the condensation temperature of the relief mass and the final state, may be designed and configured to be stable at absorbing and dissipating the energy over time in a plurality of absorption processes. In some example implementations the multi-component mixtures may be designed and configured with diverse boiling points that are evenly distributed between the condensation temperature of the relief mass and the final state of the relief mass.

FIGS. 6 to 12 depict exemplary chart views of data representing vapor/liquid phase mass change due to pressurized condensation for a plurality of hydrocarbons, in line with the example chart depicted by FIG. 4 and in accordance with the model depicted by FIG. 5.

Figure 6:
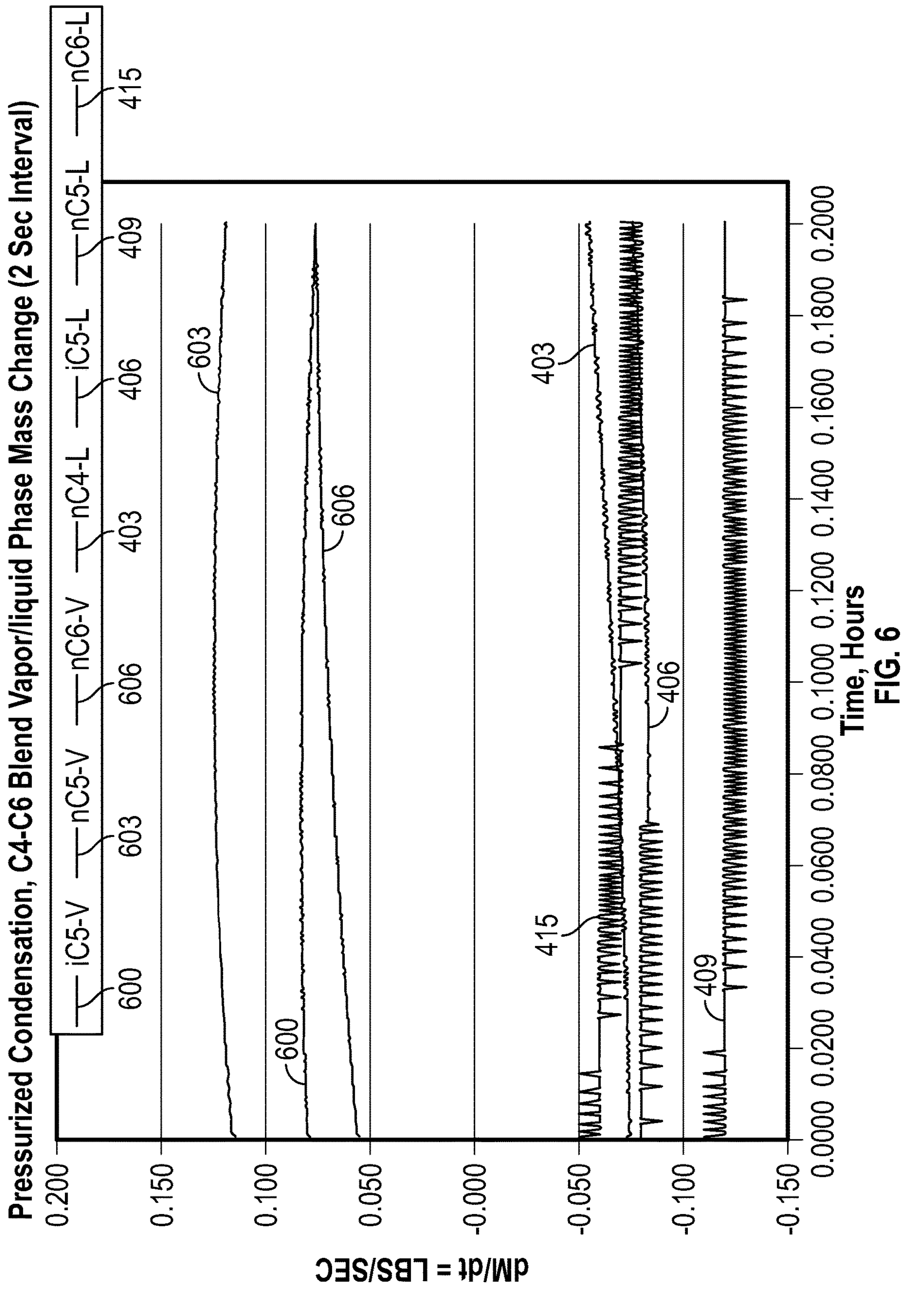
FIG. 6 depicts a chart view of vapor/liquid phase mass change data illustrating an exemplary aspect of pressurized condensation for a plurality of hydrocarbons.

In FIG. 6, the vertical axis represents delta changes in mass (M) between liquid and vapor with respect to time (t), dM/dt in units of LBS/SEC, and the horizontal axis represents time in units of Hours. The mass change data charted by FIG. 6 illustrates change in mass with respect to time for iC5-V 600, nC5-V 603, nC6-V 606, nC4-L 403, iC5-L 406, nC5-L 409 and nC6-L 415. In FIGS. 4 and 6-12 plots designated with a label that includes an "L" represent a liquid (e.g. iC4-L 400 in FIG. 4) and plots designated with a label that includes a "V" represent a vapor (e.g. iC5-V in FIG. 6).

Figure 7:
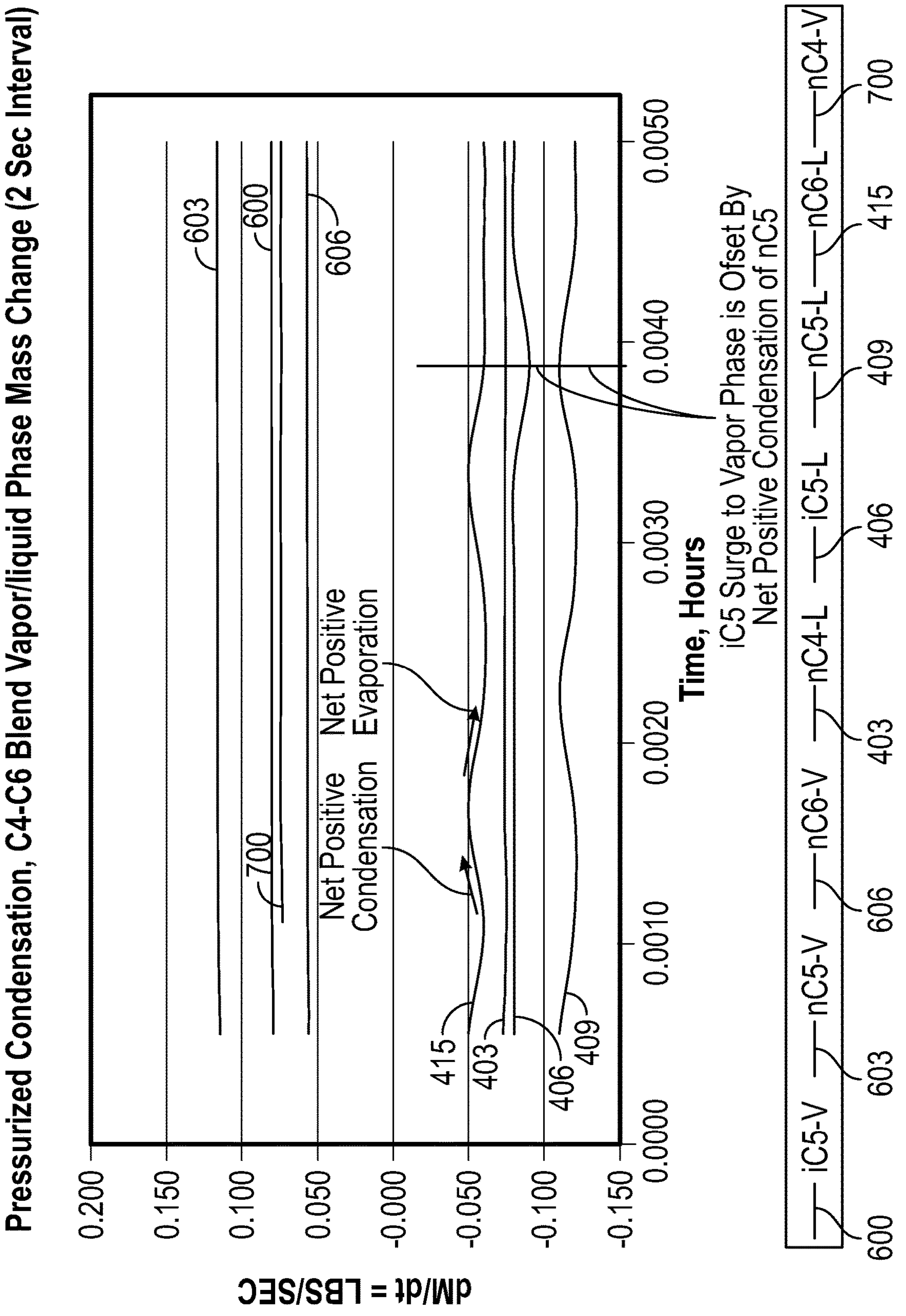
FIG. 7 depicts a chart view of vapor/liquid phase mass change data illustrating an exemplary aspect of pressurized condensation for a plurality of hydrocarbons.

In FIG. 7, the vertical axis represents delta changes in mass (M) between liquid and vapor with respect to time (t), dM/dt in units of LBS/SEC, and the horizontal axis represents time in units of Hours. The mass change data charted by FIG. 7 illustrates change in mass with respect to time for iC5-V 600, nC5-V 603, nC6-V 606, nC4-L 403, iC5-L 406, nC5-L 409, nC6-L 415 and nC4-V 700. The example depicted by FIG. 7 illustrates the iC5-L 406 surge to vapor phase is offset by the net positive condensation of nC5-L 409.

Figure 8:
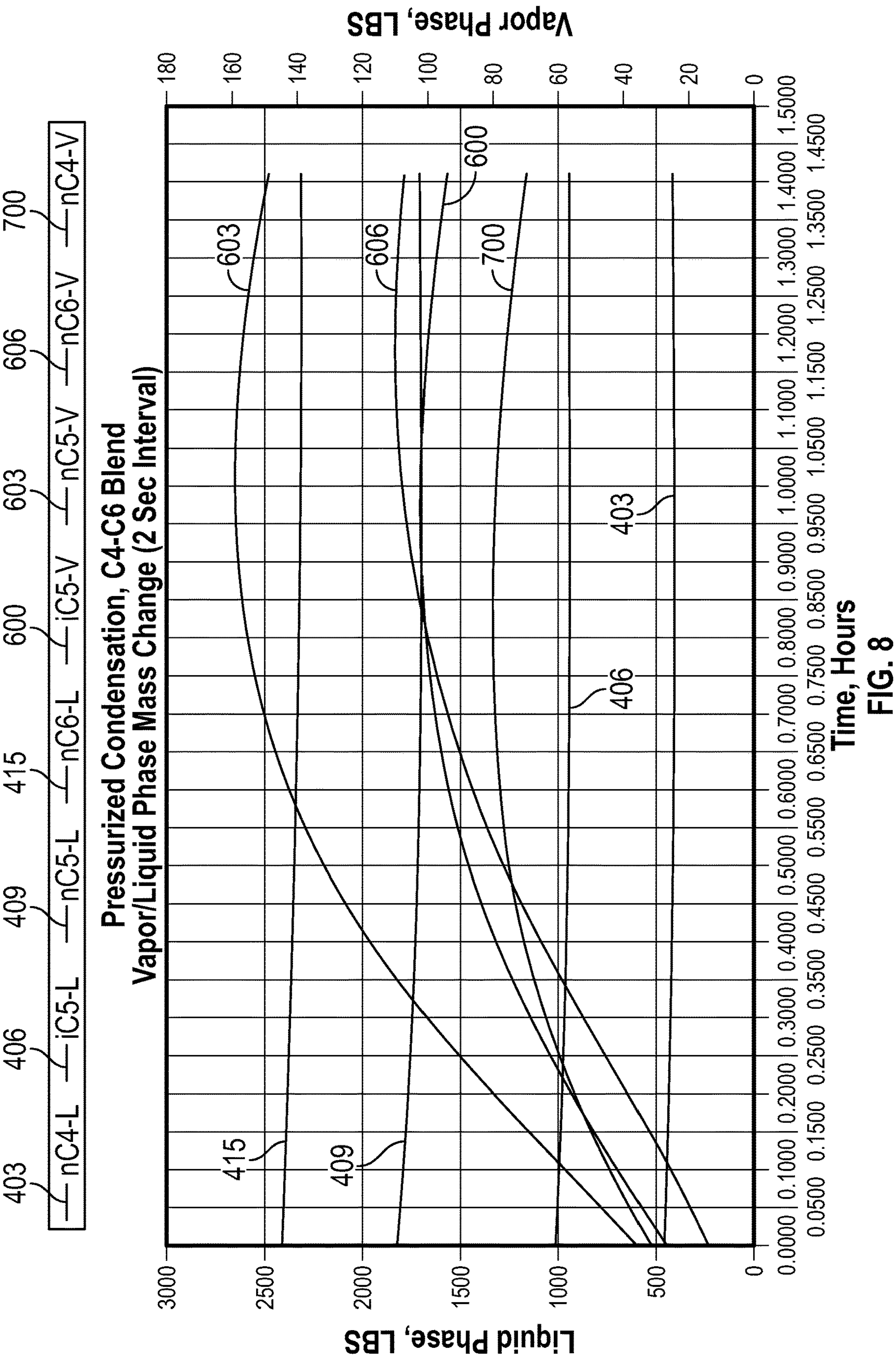
FIG. 8 depicts a chart view of vapor/liquid phase mass change data illustrating an exemplary aspect of pressurized condensation for a plurality of hydrocarbons.

In FIG. 8, the vertical axis represents mass in units of LBS with the left vertical scale showing liquid phase mass in LBS and the right vertical scale showing vapor phase mass in LBS, and the horizontal axis represents time in units of Hours. The mass change data charted by FIG. 8 illustrates change in mass with respect to time for nC4-L 403, iC5-L 406, nC5-L 409, nC6-L 415, iC5-V 600, nC5-V 603, nC6-V 606 and nC4-V 700.

Figure 9:
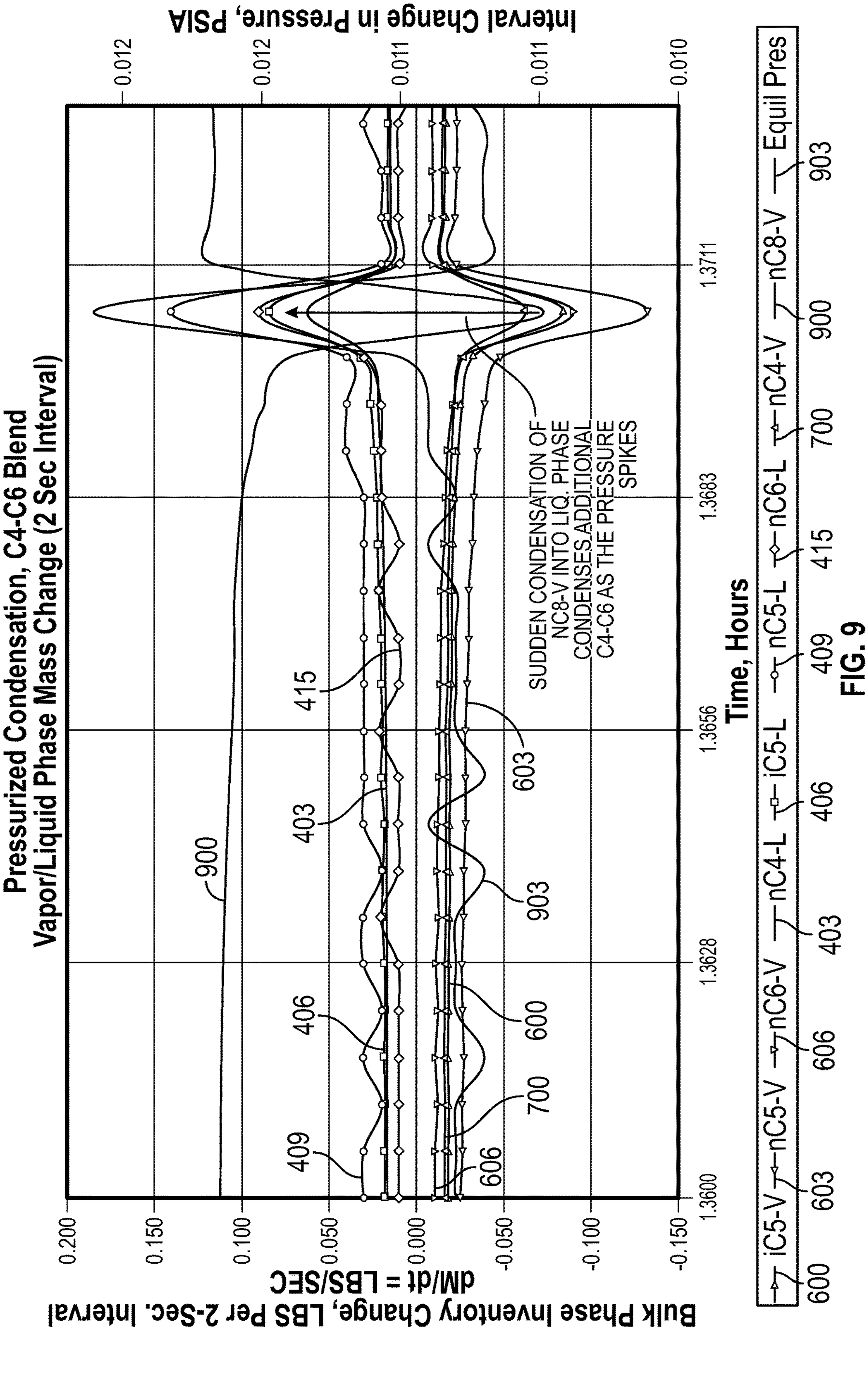
FIG. 9 depicts a chart view of vapor/liquid phase mass change data illustrating an exemplary aspect of pressurized condensation for a plurality of hydrocarbons.

In FIG. 9, the vertical axis represents delta changes in mass (M) between liquid and vapor with respect to time (t), dM/dt in units of LBS/SEC with the left vertical scale showing Bulk Phase Inventory Change, LBS per 2 Second Interval and the right vertical scale showing Interval Change in Pressure, PSIA, and the horizontal axis represents time in units of Hours. The mass change data charted by FIG. 9 illustrates change in mass with respect to time for iC5-V 600, nC5-V 603, nC6-V 606, nC4-L 403, iC5-L 406, nC5-L 409, nC6-L 415, nC4-V 700, nC8-V 900 and Equil Pres 903. The example depicted by FIG. 9 illustrates the sudden condensation of nC8-V 900 into a liquid phase condenses additional C4-C6 as the equilibrium pressure (Equil Pres 903) spikes.

Figure 10:
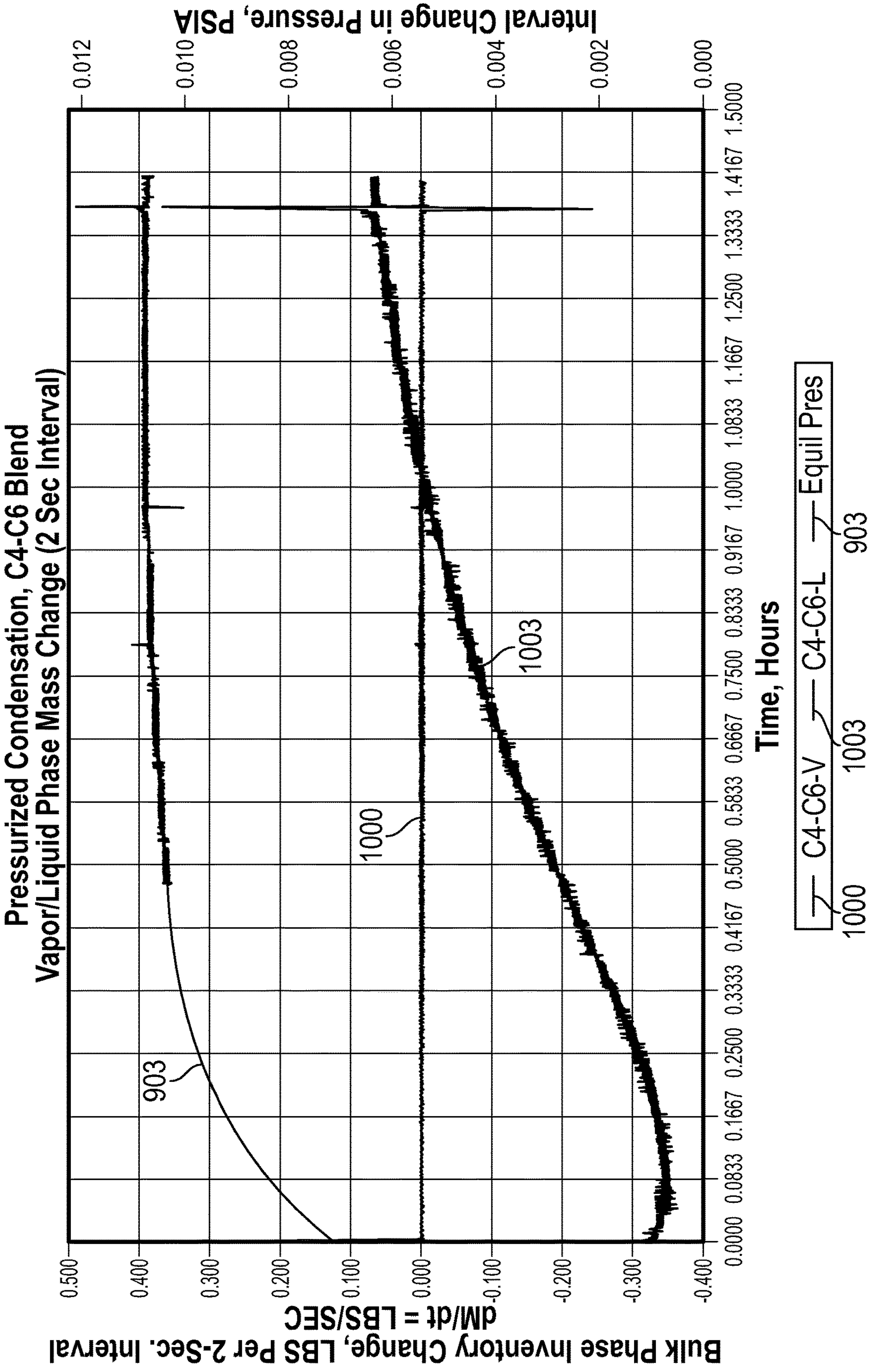
FIG. 10 depicts a chart view of vapor/liquid phase mass change data illustrating an exemplary aspect of pressurized condensation for a plurality of hydrocarbons.

In FIG. 10, the vertical axis represents delta changes in mass (M) between liquid and vapor with respect to time (t), dM/dt in units of LBS/SEC with the left vertical scale showing Bulk Phase Inventory Change, LBS per 2 Second Interval and the right vertical scale showing Interval Change in Presssure, PSIA, and the horizontal axis represents time in units of Hours. The mass change data charted by FIG. 10 illustrates change in mass with respect to time for C4-C6-V 1000, C4-C6-L 1003 and Equil Pres 903.

Figure 11:
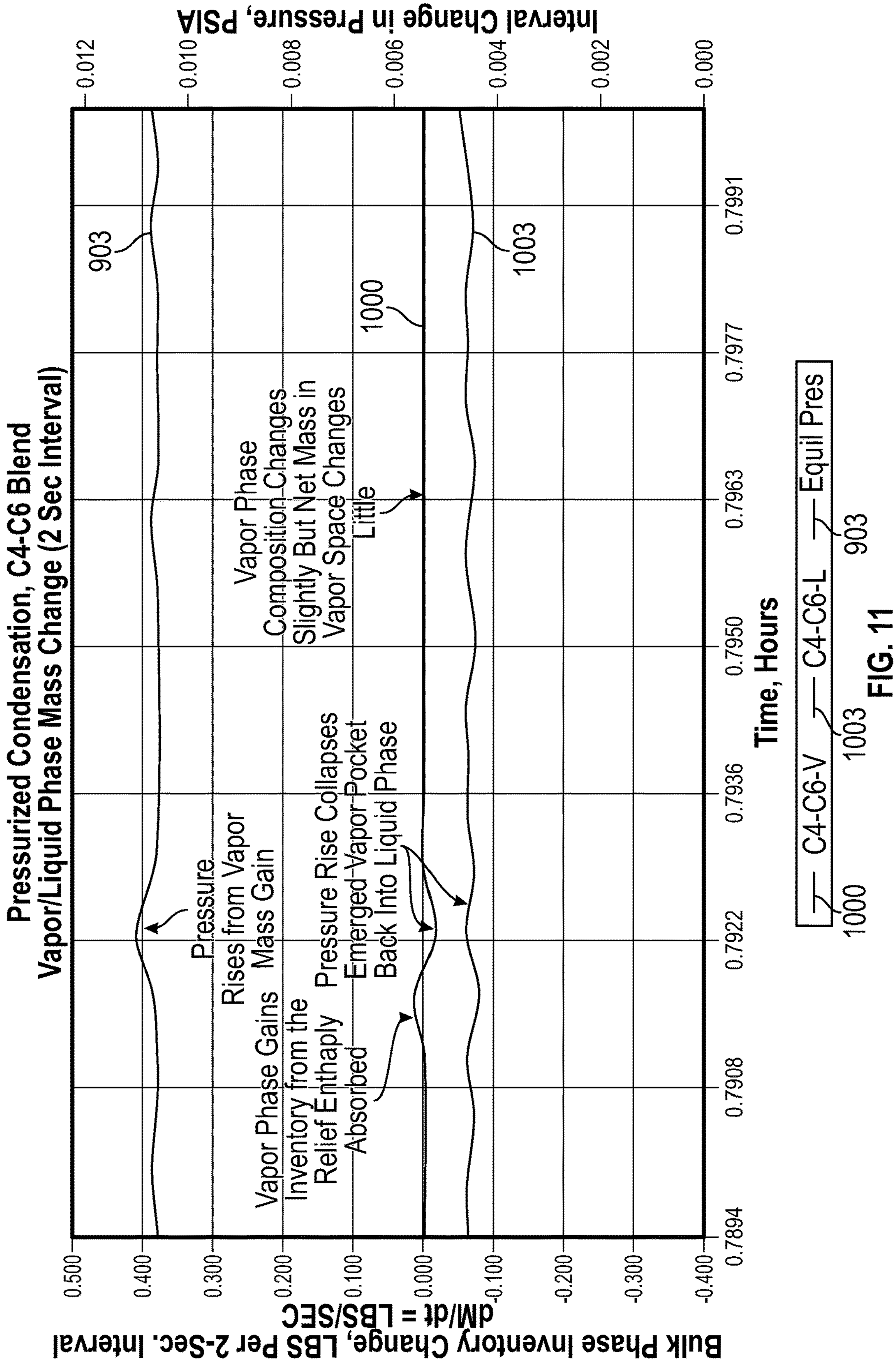
FIG. 11 depicts a chart view of vapor/liquid phase mass change data illustrating an exemplary aspect of pressurized condensation for a plurality of hydrocarbons.

In FIG. 11, the vertical axis represents delta changes in mass (M) between liquid and vapor with respect to time (t), dM/dt in units of LBS/SEC with the left vertical scale showing Bulk Phase Inventory Change, LBS per 2 Second Interval and the right vertical scale showing Interval Change in Presssure, PSIA, and the horizontal axis represents time in units of Hours. The mass change data charted by FIG. 11 illustrates change in mass with respect to time for C4-C6-V 1000, C4-C6-L 1003 and Equil Pres (Equilibrium Pressure) 903. The example depicted by FIG. 11 illustrates the C4-C6-V 1000 vapor phase inventory gain from relief enthalpy absorbed and the equilibrium pressure (Equil Pres 903) rises from the C4-C6-V 1000 vapor phase mass gain. In the example depicted by FIG. 11 the rise of Equil Pres 903 also collapses emerged C4-C6-V 1000 and C4-C6-L 1003 vapor pockets back into a liquid phase.

Figure 12:
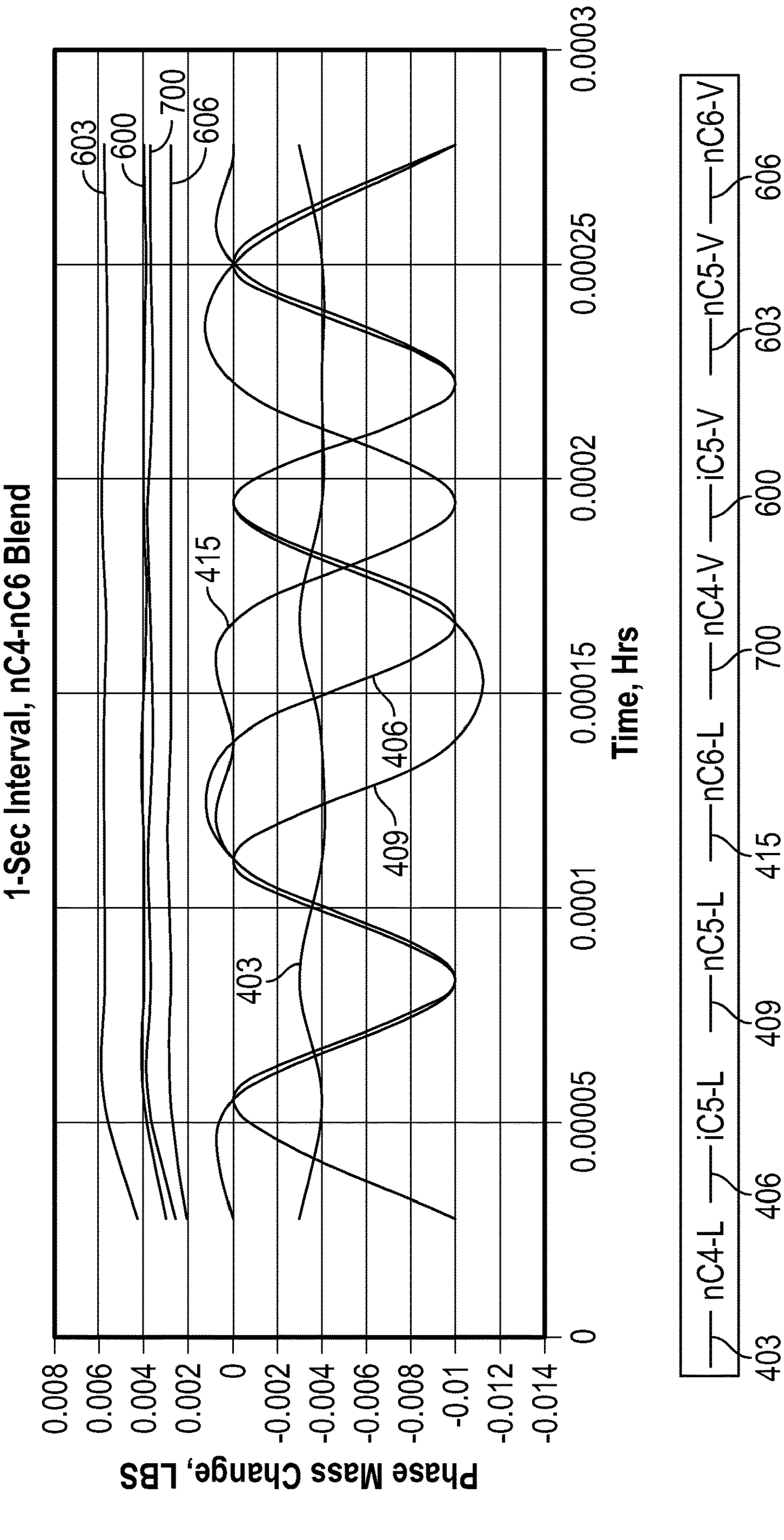
FIG. 12 depicts a chart view of vapor/liquid phase mass change data illustrating an exemplary aspect of pressurized condensation for a plurality of hydrocarbons.

In FIG. 12, the vertical axis represents phase mass change in units of LBS and the horizontal axis represents time in units of Hours. The mass change data charted by FIG. 12 illustrates change in mass with respect to time for nC4-L 400, iC5-L 406, nC5-L 409, nC6-L 415, nC4-V 700, iC5-V 600, nC5-V 603 and nC6-V 606.

FIG. 13 depicts exemplary models of physics variables that may be measured, manipulated or enhanced to govern or describe the operation of various implementations. FIG. 13 shows an exemplary chart of process variables/equations 1300 governing system design variables that can be manipulated or enhanced to extend the Total Absorbed Energy of the system at the "final state." For example at small-scales, embodiments with enhanced ambient heat leakage and containment mass might be preferred over enhancing total volumetric capacity. However at larger scales, increasing the plurality of high-boiling species and total volume available may be more important to the ultimate thermal capacity. The depicted process variables/equations 1300 include the energy sinks 1303 and the material sinks 1306. These process variables/equations 1300 shown in FIG. 13 are also presented below by written description.

Energy Sinks 1303

Enthalpy Gain of Liquid Phase 1306*a*

$$\Delta H_L=\Delta U_L+\Delta P_S*V \qquad 1306b$$

Large volume of Low-Vapor-Pressure (LVP) Liquid provides stable liquid mass to absorb energy over time.

Solvent Latent Heat of Vaporization 1309*a*

$$\Delta H_S=M_{SV2}*\lambda_S(p) \qquad 1309b$$

A Soluble High-Vapor-Pressure (HVP) Liquid will periodically flash to transfer the absorbed energy to the vapor phase. Varying the boiling points of the HVP Liquids will significantly stabilize the energy transfer at the phase boundary.

Latent Heat of Condensation Relief Vapors 1312*a*

$$\Delta H_R=M_{RV}*\lambda_R(p) \qquad 1312b$$

Selecting the proper LVP Liquid to use based on the physical properties of the relief material.

Ambient Heat Losses 1315*a*

$$\Delta H_A=U_O*A_S*((T_2+T_1)/2-T_{AMB}) \qquad 1315b$$

Additional surface area added to vessel specifically for maximizing local convective losses.

Vessel Mass Temperature Gain 1318*a*

$$Q_{VS}=M_V*C_{P,AV}*(T_f-T_0) \qquad 1318b$$

Vessel material properties thickness selection, vessel jacketing with circulation to enhance convective losses.

Enthalpy Gain of Vapor Phase 1321*a*

$$\Delta H_V=\Delta U_V+\Delta P*V \qquad 1321b$$

At the initial state, at least one compressible gas must be present to form a stable vacuum. In moving toward the final state of the relief event, the vapor phase continuously changes in equilibrium composition moving from lighter components to heavier ones, which slows and stabilizes the vessel pressure.

Vapor Phase Compression 1324*a*

$$P_c=[\Upsilon Q_1P_1/(\Upsilon-1)][(P_2/P_1)^{((\Upsilon-1/\Upsilon)}] \qquad 1324b$$

Starting at the lowest arming pressure to provide the most delta-p between initial and final states. Filling vapor space with gases that can condense as they pressurize, automatically minimizes rate of pressure rise allowing for longer relief event times.

Emitted Acoustic Energy 1327*a*

$$W_{p,i}=\Sigma 1/2\mu_i\omega_i^2\nu^2\lambda_i \qquad 1327b$$

Vessel may be constructed with acoustic dampening elements to prevent resonance that could destabilize the system mechanically.

Radiation Loss 1330*a*

$$P_{NET}=A\ \sigma\varepsilon(T^4-T_0^4) \qquad 1330b$$

Extra Sensible Loss Contributors 1333*a*

$$\Delta H_x=M_V*C_{P,AV}*(T_0-T_1) \qquad 1333b$$

Addition of either passive or active mechanical elements, such as a radiator coil, or forced-convection fan cooler will extend time to reach final state.

Material Sinks 1306

Vapor Phase Densification 1336*a*

$$\Delta M_V=V_{V2}*r_2-V_{V1}*r_1 \qquad 1336b$$

Liquid Phase Densification 1339*a*

$$\Delta M_L=L_{V2}*r_2-L_{V1}*r_1 \qquad 1339b$$

Total Volumetric Capacity Available 1342*a*

$$\Delta M_L=\pi*D_V^2/4*(L_{MAX}-L_1) \qquad 1342b$$

Largely a capacity factor that is determined from the relief event and maximum safe duration allowed. See basis for sizing examples in the specification.

Direct Mass Transfers 1345*a*

$$\Delta M_{RLF}=\text{variable} \qquad 1345b$$

The embodiment where accumulated Low-Vapor-Pressure (LVP) and Condensed Relief Liquids are discharged from the container while ambient fresh LVP Material is added to extend the relief capacity of the system. This step may be accomplished passively.

Although various features have been described with reference to the Figures, other features are possible. In an illustrative example, preparing an exemplary containment vessel in accordance with what has been disclosed herein may be referred to as an arming process. Multiple features have been designed into the process relief system disclosed herein to provide the system with advantageous self-regulating properties. For example, because the vapor pressure of the LVP fluid is so low, removing a small amount will result in a deep vacuum in the head space as the head space forms when the LVP liquid is removed. This deep vacuum may cause the LVP extraction/drain pump to cavitate and lose suction. The initial head space volume may be too small to contain the volume of material relieved from the process. Admitting some HVP liquid into the very small head space, which is under deep vacuum due to removing LVP fluid from the sealed system, would cause the HVP fluid to flash/evaporate and cause the pressure to rise enough for the LVP fluid drain pump to regain suction. Regaining suction with a pump may be referred to as having adequate net positive suction head (NPSH). A pump may have a minimum NPSH requirement. This is how head space volume is increased (the hole) and will be determined by the target pressure, shown for example as 10 psia (a vacuum). Allowing pressure to rise enough for the LVP fluid drain pump to regain suction illustrates an example scenario using an exemplary self-regulating property of the system and permits a system design to use a moderately sized vessel capable of containing the much larger volume of material relieved from the entire facility. Increasing HVP fluid inventory, as a vapor, increases the volume available for the relieved material, the hole. This is because the HVP fluid is essentially 100% vapor at an exemplary target pressure: 10 psia. At ambient temperatures, pentane is a gas at 10 psia. Raising the pressure, caused by the relief event, results in the HVP fluid, a vapor, condensing to a liquid. An exemplary rule of thumb ratio of light HC vapor to liquid is ~300:1. This ratio is why the capacity to absorb relieved material may be much larger than the physical volume of an exemplary relief vessel implementation. This gives the system a tendency toward maintaining the volume of the hole as the relief event unfolds; providing an example of the self-regulating property of the system.

In an illustrative example, using a multi-component mixture to distribute relief mass energy over time using a plurality of energy absorption processes in a respective plurality of component hydrocarbons may reduce the peak energy to be absorbed by a containment vessel. For example, a multicomponent mixture may be designed and configured with component hydrocarbon species selected and their mass ratios adjusted to achieve particular design objectives. In some simulation scenarios based on the string model disclosed by FIG. 5, the oscillating masses were calculated to generate around 300 watts of net sonic power, which explains the low-frequency drone known to occur in blocked-in vessels absorbing energy. Some implementations may comprise a multi-component mixture designed and configured to mitigate impact by this sonic component, especially at scale. For example at small scales, a multi-component mixture implementation with enhanced ambient heat leakage and containment mass might be preferred over enhancing total volumetric capacity. However at larger scales, increasing the plurality of high-boiling species and total volume available may be more important to the ultimate thermal capacity.

In an illustrative example HVP material may be used to supplement or enhance an exemplary head space in the containment vessel. Without the presence of the HVP material the head space volume may be very low as when, for example, LVP fluid is pumped from the system (for example during an exemplary arming procedure) a vacuum is created. Not much LVP fluid would need to be removed before an LVP extraction pump may lose suction. By admitting a small amount of HVP into the head space where the HVP material flashes to a vapor (for example due to very low pressure in the head space, causing an increase in pressure (still under vacuum)) which would allow more HVP fluid to be removed and also increasing head space volume while remaining under vacuum.

An exemplary implementation may comprise usage or configuration of various sensors configured to measure one or more physical quantity such as, for example, temperature, pressure, flow rate, and the like. An exemplary implementation may comprise usage or configuration of various actuators configured to activate, open, close, start, or stop various devices such as for example valves, vents, drains and pumps. An exemplary implementation may comprise usage or configuration of a controller or control system designed to sense input, determine conditions, and implement actions based on the input or programmed rules or procedures. For example an exemplary implementation may comprise usage or configuration of a sensor configured to permit determining the headspace vacuum pressure. An exemplary implementation may comprise a controller configured to determine if a particular pressure value of headspace vacuum pressure has been reached. The controller may be configured to use a vacuum pressure sensor and a predetermined threshold vacuum pressure to determine whether a particular pressure value of headspace vacuum pressure has been reached. The controller may be configured to determine the run time of a draw pump governed by the controller, and to use the pump run time to estimate whether the desired initial pressure of a headspace vacuum has been reached based on run time of the draw pump.

As used herein, the term "high-vapor-pressure (HVP) refers to fluids with a vapor pressure at ambient pressures and temperatures of less than 10 psia. For example, normal pentane has a vapor pressure of about 60 kPa(g) at 20° C.

As used herein, the term "low-vapor-pressure (LVP) refers to but not limited to very heavy oils such as petroleum derived vacuum gas oils having negligible vapor pressures at ambient conditions and with boiling points at ambient pressure in excess of 400° C.

As used herein, the term hydrocarbon refers to saturated hydrocarbons as used as examples in this document but could be extended to unsaturated hydrocarbons, alcohols, aldehydes, ketones, carboxylic acids etc.

An exemplary method may comprise: fluidly coupling a pressure-equalized containment vessel (103) to a Process Relief Device (PRD) (106), wherein the PRD (106) is configured to fluidly couple the containment vessel (103) with a process vessel (154) in response to a process relief event in the process vessel (154); preloading the pressure-equalized containment vessel (103) with a Low Vapor Pressure (LVP) liquid (130); partially filling an evacuated headspace (136) above the LVP liquid (130) in the containment vessel (103) with a High Vapor Pressure (HVP) material (300) configured to flash to HVP material (300) vapors and occupy the headspace (136); relieving a process relief mass (503) from the process vessel (154) into the containment vessel (103) during a process relief event in the process vessel (154), using the PRD (106); and permitting the HVP material (300) vapors to mix with the process relief mass (503) and condense to liquid in the containment vessel (103).

The HVP material (300) may further comprise a plurality of hydrocarbons.

The method may further comprise equalizing pressure in the containment vessel (103) with ambient conditions outside the containment vessel (103), using a vent (112).

Equalizing pressure in the containment vessel (103) may further comprise opening the vent (112), using a vent valve (115).

The method may further comprise preloading the containment vessel (103) with the LVP liquid (130) after equalizing pressure in the containment vessel (103).

Preloading the containment vessel (103) may further comprise filling the containment vessel (103) with the LVP liquid (130), using a fill valve (124).

The method may further comprise sealing the containment vessel (103) from ambient conditions outside the containment vessel (103), using a vent (112), after preloading the containment vessel (103).

Sealing the containment vessel (103) may further comprise closing the vent (112), using a vent valve (115).

The method may further comprise forming the evacuated headspace (136) above the LVP liquid (130) in the containment vessel (103) after sealing the containment vessel (103).

The method may further comprise forming the evacuated headspace (136) above the LVP liquid (130) in the containment vessel (103) by drawing down the LVP liquid (130) in the containment vessel (103), using a drain valve (121).

Drawing down the LVP liquid (130) in the containment vessel (103) may further comprise evacuating at least a portion of the LVP liquid (130) from the containment vessel (103) through the drain valve (121), using a draw pump (118).

Evacuating the at least the portion of the LVP liquid (130) from the containment vessel (103) may further comprise opening the drain valve (121) and activating the draw pump (118).

Forming the evacuated headspace (136) may further comprise forming a headspace vacuum (139) in the headspace (136) above the LVP liquid (130) in the containment vessel (103).

The method may further comprise drawing down the LVP liquid (130) in the containment vessel (103) until a desired initial headspace vacuum (139) pressure has been reached.

The desired initial headspace vacuum (139) pressure may be less than a predetermined target vacuum pressure.

The method may further comprise determining if the desired initial headspace vacuum (139) pressure has been reached.

The method may further comprise determining if the desired initial pressure of the headspace vacuum (139) has been reached using a vacuum pressure sensor and a predetermined threshold vacuum pressure.

The method may further comprise determining if the desired initial pressure of the headspace vacuum (139) has been reached based on run time of a draw pump (118).

The method may further comprise in response to determining the desired initial pressure of the headspace vacuum (139) has been reached, closing the drain valve (121) and stopping a draw pump (118).

The process relief mass (503) may be relieved from the process vessel (154) through an outlet of the PRD (106) into the containment vessel (103), using a sealed relief header (109).

The method may further comprise configuring the outlet of the PRD (106) at an elevation higher than the containment vessel (103).

Preloading the pressure-equalized containment vessel (103) with the LVP liquid (130) may further comprise configuring an LVP liquid (130) level higher than an elevation level at which the sealed relief header (109) connects to the containment vessel (103).

The plurality of hydrocarbons may further comprise a 50/50 mixture of isopentane and n-pentane.

The plurality of hydrocarbons may further comprise at least three hydrocarbons.

The plurality of hydrocarbons may further comprise C4, C5 and C6.

The plurality of hydrocarbons may further comprise C4, C5, C6, C7, C8, C9 and C10.

The plurality of hydrocarbons may further comprise at least two of C4, C5, C6, C7, C8, C9 and C10.

The method may further comprise recovering at least a portion of the process relief mass (503) in a liquid state from the containment vessel (103).

The method may further comprise recovering the at least the portion of the process relief mass (503) in a mixture with at least a portion of the HVP material (300).

The method may further comprise returning the at least the portion of the process relief mass (503) recovered from the containment vessel (103) to a processing unit (148).

An exemplary apparatus may comprise: a pressure-equalized containment vessel (103) fluidly coupled to a Process Relief Device (PRD) (106), wherein the PRD (106) is configured to fluidly couple the containment vessel (103) with a process vessel (154) in response to a process relief event in the process vessel (154), and wherein the pressure-equalized containment vessel (103) is preloaded with a Low Vapor Pressure (LVP) liquid (130); and an evacuated headspace (136) above the LVP liquid (130) in the containment vessel (103), wherein the evacuated headspace (136) above the LVP liquid (130) has been partially filled with a High Vapor Pressure (HVP) material (300) configured to flash to HVP material (300) vapors and occupy the headspace (136), and wherein the PRD (106) is configured to relieve a process relief mass (503) from the process vessel (154) into the containment vessel (103) during the process relief event and permit the HVP material (300) vapors to mix with the process relief mass (503) and condense to liquid in the containment vessel (103).

The HVP material (300) may further comprise a plurality of hydrocarbons.

The apparatus may further comprise a vent (112) configured to fluidly couple the containment vessel (103) with ambient conditions outside the containment vessel (103) to equalize pressure in the containment vessel (103) with the ambient conditions.

The apparatus may further comprise a vent valve (115) configured to open or close the vent (112).

The apparatus may further comprise the vent (112) is open.

The apparatus may further comprise a fill valve (124) operably coupled with the containment vessel (103) to permit filling the containment vessel (103) with the LVP liquid (130).

The apparatus may further comprise the containment vessel (103) is sealed from ambient conditions outside the containment vessel (103).

The apparatus may further comprise a vent valve (115) configured to seal the containment vessel (103) from the ambient conditions based on closing a vent (112) configured to fluidly couple the containment vessel with the ambient conditions outside the containment vessel (103).

The apparatus may further comprise a headspace vacuum (139) in the evacuated headspace (136) above the LVP liquid (130) in the containment vessel (103).

The apparatus may further comprise a drain valve (121) in fluid communication with the containment vessel (103), wherein the drain valve (121) is configured to be open or closed, and wherein the drain valve (112) when open is operable to permit drawing down the LVP liquid (130) in the containment vessel (103) and form the evacuated headspace (136) above the LVP liquid (130) in the containment vessel (103).

The apparatus may further comprise a draw pump (118) in fluid communication with the drain valve (121), wherein the draw pump (118) is configured to evacuate at least a portion of the LVP liquid (130) from the containment vessel (103) through the drain valve (121).

The apparatus may further comprise the draw pump (118) is activated and the drain valve (112) is open.

The evacuated headspace (136) may further comprise a headspace vacuum (139) and wherein the apparatus further comprises a source of HVP material configured to introduce HVP liquid into the evacuated headspace (136).

The apparatus may further comprise a desired initial headspace vacuum (139) pressure in the evacuated headspace (136).

The desired initial headspace vacuum (139) pressure may be less than a predetermined target vacuum pressure.

The apparatus may further comprise a vacuum pressure sensor configured to permit determining the headspace vacuum (139) pressure.

The apparatus may further comprise a controller configured to determine if the desired initial pressure of the headspace vacuum (139) has been reached using the vacuum pressure sensor and a predetermined threshold vacuum pressure.

The apparatus may further comprise a controller configured to determine if the desired initial pressure of the headspace vacuum (139) has been reached based on using run time of a draw pump (118).

The apparatus may further comprise a controller configured to determine if the desired initial pressure of the headspace vacuum (139) has been reached, and in response to determining the desired initial pressure of the headspace vacuum (139) has been reached, closing the drain valve (121) and stopping a draw pump (118).

The apparatus may further comprise a sealed relief header (109) operably coupling an outlet of the PRD (106) into the containment vessel (103), wherein the process relief mass (503) is relieved from the process vessel (154) through the sealed relief header (109).

The apparatus may further comprise the outlet of the PRD (106) is at an elevation higher than the containment vessel (103).

The apparatus may further comprise the pressure-equalized containment vessel (103) is preloaded with the LVP liquid (130) having an LVP liquid (130) level higher than an elevation level at which the sealed relief header (109) connects to the containment vessel (103).

The plurality of hydrocarbons may further comprise a 50/50 mixture of isopentane and n-pentane.

The plurality of hydrocarbons may further comprise at least two hydrocarbons.

The plurality of hydrocarbons may further comprise at least three hydrocarbons.

The plurality of hydrocarbons may further comprise C4, C5 and C6.

The plurality of hydrocarbons may further comprise C4, C5, C6, C7, C8, C9 and C10.

The plurality of hydrocarbons may further comprise at least two of C4, C5, C6, C7, C8, C9 and C10.

The apparatus may further comprise at least a portion of the process relief mass (503) in a liquid state within the containment vessel (103), wherein the at least a portion of the process relief mass (503) in the liquid state within the containment vessel (103) is in equilibrium with an LVP liquid phase final temperature.

The apparatus may further comprise the containment vessel (103) configured to be fluidly coupled to a processing unit (148) to return the at least a portion of the process relief mass (503) recovered from the containment vessel (103) to the processing unit (148).

An exemplary method may comprise: configuring a high-vapor-pressure (HVP) material (300) comprising a plurality of component hydrocarbons; flashing the HVP material (300) from an HVP material (300) liquid to an HVP material (300) vapor as the HVP material (300) liquid is introduced into an evacuated portion of a containment vessel (103); introducing a process relief mass (503) from a process relief event occurring outside the containment vessel (103) to mix with the HVP material (300) vapor in the containment vessel (103); and distributing energy from the process relief mass (503) within the containment vessel (103) using a plurality of individual energy absorption processes as the plurality of component hydrocarbons respectively condense to liquid phases over time.

The plurality of component hydrocarbons may further comprise at least two hydrocarbons.

The plurality of component hydrocarbons may further comprise at least three hydrocarbons.

The plurality of component hydrocarbons may further comprise n-hexane.

The plurality of component hydrocarbons may further comprise isopentane.

The plurality of component hydrocarbons may further comprise n-pentane.

The plurality of component hydrocarbons may further comprise a mixture comprising isopentane and n-pentane.

The mixture comprising isopentane and n-pentane may further comprise a 50/50 mixture of isopentane and n-pentane.

The plurality of component hydrocarbons may further comprise C4, C5 and C6.

The plurality of component hydrocarbons may further comprise C4, C5, C6, C7, C8, C9 and C10.

The plurality of component hydrocarbons may further comprise at least two of C4, C5, C6, C7, C8, C9 and C10.

The plurality of component hydrocarbons may further comprise at least three of C4, C5, C6, C7, C8, C9 and C10.

The plurality of component hydrocarbons may further comprise nC4.

The plurality of component hydrocarbons may further comprise nC5.

The plurality of component hydrocarbons may further comprise nC6.

The plurality of component hydrocarbons may further comprise nC4, nC5 and nC6.

The plurality of component hydrocarbons may have boiling points from 38° C. to 105° C. at ambient pressure.

The evacuated portion of the containment vessel (103) may further comprise an evacuated headspace (136) disposed above a Low Vapor Pressure (LVP) liquid (130) retained by the containment vessel (103).

The evacuated headspace (136) may have a headspace vacuum (139) pressure low enough to cause the plurality of component hydrocarbons to flash to a vapor in the headspace (136).

The method may further comprise forming the evacuated headspace (136) above the LVP liquid (130) in the containment vessel (103) by drawing down the LVP liquid (130) in the containment vessel (103) through a drain valve (121), using a draw pump (118).

The method may further comprise drawing down the LVP liquid (130) in the containment vessel (103) until a headspace vacuum (139) pressure low enough to cause the plurality of component hydrocarbons to flash to a vapor in the headspace (136) has been reached.

The method may further comprise determining if a headspace vacuum (139) pressure low enough to cause the plurality of component hydrocarbons to flash to a vapor in the headspace (136) has been reached.

The method may further comprise determining if a headspace vacuum (139) pressure low enough to cause the plurality of component hydrocarbons to flash to a vapor in the headspace (136) has been reached, using a vacuum pressure sensor and a predetermined threshold vacuum pressure.

The predetermined threshold vacuum pressure may be not greater than 10.0 psia.

The predetermined threshold vacuum pressure may be determined as a function of a vapor pressure of at least one hydrocarbon of the plurality of hydrocarbons.

The method may further comprise determining if a headspace vacuum (139) pressure low enough to cause the plurality of component hydrocarbons to flash to a vapor in the headspace (136) has been reached based on run time of a draw pump (118).

The plurality of component hydrocarbons may have a respective plurality of boiling point temperatures distributed from a condensation temperature of the process relief mass (503) to a final-state temperature of the process relief mass (503).

The method may further comprise recovering at least a portion of the process relief mass (503) in a liquid state from the containment vessel (103).

The method may further comprise recovering the at least the portion of the process relief mass (503) in a mixture with at least a portion of the HVP material (300).

The method may further comprise returning the at least the portion of the process relief mass (503) recovered from the containment vessel (103) to a processing unit (148).

The process relief event may further comprise a result of an overpressure event.

The process relief event may further comprise a result of a planned relieve event.

An exemplary apparatus may comprise: a high-vapor-pressure (HVP) material (300) comprising a plurality of component hydrocarbons; a containment vessel (103), wherein an evacuated portion of the containment vessel (103) has a vacuum pressure low enough to cause the HVP material (300) to flash to an HVP vapor when the HVP material (300) is introduced into the evacuated portion of the containment vessel (103); a Process Relief Device (PRD) (106) configured to introduce a process relief mass (503) into the containment vessel (103) from a process relief event occurring outside the containment vessel (103), and mix the process relief mass (503) with the HVP material (300) vapor in the containment vessel (103); and a plurality of individual energy absorption processes configured to distribute energy from the process relief mass (503) over time within the containment vessel (103) as the plurality of component hydrocarbons respectively condense to liquid phases.

The plurality of component hydrocarbons may further comprise at least two hydrocarbons.

The plurality of component hydrocarbons may further comprise at least three hydrocarbons.

The plurality of component hydrocarbons may further comprise n-hexane.

The plurality of component hydrocarbons may further comprise isopentane.

The plurality of component hydrocarbons may further comprise n-pentane.

The plurality of component hydrocarbons may further comprise a mixture comprising isopentane and n-pentane.

The mixture comprising isopentane and n-pentane may further comprise a 50/50 mixture of isopentane and n-pentane.

The plurality of component hydrocarbons may further comprise C4, C5 and C6.

The plurality of component hydrocarbons may further comprise C4, C5, C6, C7, C8, C9 and C10.

The plurality of component hydrocarbons may further comprise at least two of C4, C5, C6, C7, C8, C9 and C10.

The plurality of component hydrocarbons may further comprise at least three of C4, C5, C6, C7, C8, C9 and C10.

The plurality of component hydrocarbons may further comprise nC4.

The plurality of component hydrocarbons may further comprise nC5.

The plurality of component hydrocarbons may further comprise nC6.

The plurality of component hydrocarbons may further comprise nC4, nC5 and nC6.

The plurality of component hydrocarbons may have boiling points from 38° C. to 105° C. at ambient pressure.

The evacuated portion of the containment vessel (103) may further comprise an evacuated headspace (136) disposed above a Low Vapor Pressure (LVP) liquid (130) retained by the containment vessel (103).

The evacuated headspace (136) may have a headspace vacuum (139) pressure low enough to cause the plurality of component hydrocarbons to flash to a vapor in the headspace (136).

The apparatus may further comprise a drain valve (121) configured to fluidly couple the containment vessel (103) with a draw pump (118) configured to draw down the LVP liquid (130) in the containment vessel (103) through the drain valve (121), thereby forming the evacuated headspace (136) above the LVP liquid (130) in the containment vessel (103).

The apparatus may further comprise a controller configured to draw down the LVP liquid (130) in the containment vessel (103) until a headspace vacuum (139) pressure low enough to cause the plurality of component hydrocarbons to flash to a vapor in the headspace (136) has been reached.

The apparatus may further comprise a controller configured to determine if a headspace vacuum (139) pressure low enough to cause the plurality of component hydrocarbons to flash to a vapor in the headspace (136) has been reached, based on measurement input to the controller from a vacuum pressure sensor.

The apparatus may further comprise the controller configured to determine if the headspace vacuum (139) pressure low enough to cause the plurality of component hydrocarbons to flash to a vapor in the headspace (136) has been reached, using the vacuum pressure sensor and a predetermined threshold vacuum pressure.

The predetermined threshold vacuum pressure may be not greater than 10.0 psia.

The predetermined threshold vacuum pressure may be determined as a function of a vapor pressure of at least one hydrocarbon of the plurality of hydrocarbons.

The apparatus may further comprise the controller configured to determine if the headspace vacuum (139) pressure low enough to cause the plurality of component hydrocarbons to flash to a vapor in the headspace (136) has been reached based on run time of a draw pump (118).

The plurality of component hydrocarbons may have a respective plurality of boiling point temperatures distributed from a condensation temperature of the process relief mass (503) to a final-state temperature of the process relief mass (503).

The apparatus may further comprise at least a portion of the process relief mass (503) in a liquid state within the containment vessel (103), wherein the at least a portion of the process relief mass (503) in the liquid state within the containment vessel (103) is in equilibrium with an LVP liquid phase final temperature.

The apparatus may further comprise the containment vessel (103) configured to be fluidly coupled to a processing unit to return the at least a portion of the process relief mass (503) recovered from the containment vessel (103) to the processing unit.

The process relief event may further comprise a result of an overpressure event or a planned relieve event.

In the Summary above and in this Detailed Description, and the Claims below, and in the accompanying drawings, reference is made to particular features of various implementations. It is to be understood that the disclosure of particular features of various implementations in this specification is to be interpreted to include all possible combinations of such particular features. For example, where a particular feature is disclosed in the context of a particular aspect or implementation, or a particular claim, that feature can also be used—to the extent possible—in combination with and/or in the context of other particular aspects and implementations, and in an implementation generally.

While multiple implementations are disclosed, still other implementations will become apparent to those skilled in the art from this detailed description. Disclosed implementations may be capable of myriad modifications in various aspects, all without departing from the spirit and scope of the disclosed implementations. Accordingly, the drawings and descriptions are to be regarded as illustrative in nature and not restrictive.

It should be noted that the features illustrated in the drawings are not necessarily drawn to scale, and features of one implementation may be employed with other implementations as the skilled artisan would recognize, even if not explicitly stated herein. Descriptions of well-known components and processing techniques may be omitted so as to not unnecessarily obscure the implementation features.

In the present disclosure, various features may be described as being optional, for example, through the use of the verb "may;" or, through the use of any of the phrases: "in some implementations," "in some designs," "in various implementations," "in various designs," "in an illustrative example," or, "for example." For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be implemented in seven different ways, namely with just one of the three possible features, with any two of the three possible features or with all three of the three possible features.

In the present disclosure, the term "system" may be interchangeably used with the term "apparatus" or the term "machine." In the present disclosure, the term "method" may be interchangeably used with the term "process." In various implementations, elements described herein as coupled or connected may have an effectual relationship realizable by a direct connection or indirectly with one or more other intervening elements.

While various implementations have been disclosed and described in detail herein, it will be apparent to those skilled in the art that various changes may be made to the disclosed configuration, operation, and form without departing from the spirit and scope thereof. In particular, it is noted that the respective implementation features, even those disclosed solely in combination with other implementation features, may be combined in any configuration excepting those readily apparent to the person skilled in the art as nonsensical. Likewise, use of the singular and plural is solely for the sake of illustration and is not to be interpreted as limiting.

In the present disclosure, all descriptions where "comprising" is used may have as alternatives "consisting essentially of" or "consisting of." In the present disclosure, any method or apparatus implementation may be devoid of one or more process steps or components. In the present disclosure, implementations employing negative limitations are expressly disclosed and considered a part of this disclosure.

Where reference is made herein to a method comprising two or more defined steps, the defined steps may be carried out in any order or simultaneously (except where the context excludes that possibility), and the method may include one or more other steps which are carried out before any of the defined steps, between two of the defined steps, or after all the defined steps (except where the context excludes that possibility).

The phrases "connected to," "coupled to" and "in communication with" refer to any form of interaction between two or more entities, including mechanical, electrical, magnetic, electromagnetic, fluid, chemical, or thermal interaction. Two components may be functionally coupled to each other even though they are not in direct contact with each other. The terms "abutting" or "in mechanical union" may refer to items that are in direct physical contact with each other, although the items may not necessarily be attached together.

The word "exemplary" is used herein to mean "serving as an example, instance, or illustration." Any implementation described herein as "exemplary" is not necessarily to be construed as preferred over other implementations. While various aspects of the disclosure are presented with reference to drawings, the drawings are not necessarily drawn to scale unless specifically indicated.

Reference throughout this specification to "an implementation" or "the implementation' means that a particular feature, structure, or characteristic described in connection with that implementation is included in at least one implementation. Thus, the quoted phrases, or variations thereof, as recited throughout this specification are not necessarily all referring to the same implementation.

Similarly, it should be appreciated that in the above description, various features are sometimes grouped together in a single implementation, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects may lie in a combination of fewer than all features of any single foregoing disclosed implementation. Thus, the claims following this Detailed Description are hereby expressly incorporated into this Detailed Description, with each claim standing on its own as a separate implementation. This disclosure is intended to be interpreted as including all permutations of the independent claims with their dependent claims.

A system or method implementation in accordance with the present disclosure may be accomplished through the use of one or more computing devices. For example, one of ordinary skill in the art would appreciate that an exemplary control system or algorithmic controller appropriate for use with an implementation in accordance with the present application may generally comprise one or more of a Central processing Unit (CPU) also known as a processor. In an illustrative example the processor may be operably coupled with a Random Access Memory (RAM), a storage medium (for example, hard disk drive, solid state drive, flash memory, cloud storage), an operating system (OS), one or more application software, a display element, one or more communications means, or one or more input/output devices/means. An exemplary implementation may comprise processor executable program instructions accessible to the processor, wherein the program instructions are configured cause the implementation to perform operations. The program instructions may be stored in the RAM or other storage medium operably coupled with the processor.

An exemplary control system may use any of the disclosed methods or system operations and may combine an implementation of one or more disclosed steps of said methods or system operations into an algorithmic controller. The algorithmic controller may improve redundancy throughout an exemplary system or method implementation. The algorithmic controller may also permit improved reliability and efficiency. The algorithmic controller may furthermore ensure the constant and high quality of any product or by-product. In an example illustrative of various implementations in accordance with the present disclosure, an exemplary control system may be configured to operate, activate, deactivate, adjust, or communicate via sensors, wiring, piping, controls, pumps, or valves with various control, communication, sensing, or processing devices or systems that may be adapted to implement any of the disclosed methods. The controller may be a digital processor that continuously reads the system's instruments and computes outputs to the control elements.

An exemplary control system may implement all or a portion of any of the disclosed methods with or without processor-executable program instructions executed by one or more processor. Examples of computing devices usable with implementations of the present disclosure include, but are not limited to, proprietary computing devices, embedded computing devices, personal computers, mobile computing devices, tablet PCs, mini-PCs, servers, or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and implementation of the present disclosure are contemplated for use with any computing device.

Throughout this disclosure and elsewhere, block diagrams and flowchart illustrations may depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

Each element in flowchart illustrations may depict a step, or group of steps, of a computer-implemented method. Further, each step may contain one or more sub-steps. For the purpose of illustration, these steps (as well as any and all other steps identified and described above) may be presented in an exemplary order. It will be understood that an implementation may include an alternate order of the steps adapted to a particular application of a technique disclosed herein. All such variations and modifications are intended to fall within the scope of this disclosure. The depiction and description of steps in any particular order is not intended to exclude implementations having the steps in a different order, unless required by a particular application, explicitly stated, or otherwise clear from the context.

The respective reference numbers and descriptions of the elements depicted by the Drawings are summarized as follows.

100 relief management system
103 containment vessel
106 process relief device (PRD)
109 sealed relief header
112 vent
115 vent valve
118 draw pump
121 drain valve
124 low-vapor-pressure (LVP) liquid fill valve
127 LVP liquid source
130 LVP liquid inventory
133 seal leg
136 headspace
139 headspace vacuum
142 LVP liquid transfer outlet
145 LVP liquid transfer valve
148 processing unit
151 heater
154 process vessel
157 feed
160 heater process outlet
163 heater fuel inlet
166 sealed conduit
169 process control valve
172 product outlet
175 product
176 product pressure indicator for process pressure control (PC)
178 by-product composition control (LC) valve
181 by-product outlet
184 by-product composition indicator
187 reactor
190 separator
193 wastewater
200 LVP Liquid Phase and Condensed PRD Vapors
203 warm PRD vapors at containment vessel Maximum Allowable Working Pressure (MAWP)
206 residual PRD vapors in equilibrium with the final temperature of the LVP liquid phase and the containment vessel MAWP ("residual PRD vapors in equilibrium with final temperature")
300 high-vapor-pressure (HVP) material
303 HVP liquid fill valve
306 HVP liquid source
309 radiator coil vapor cooler
400 iC4-L
403 nC4-L
406 iC5-L
409 nC5-L
412 CYC5-L
415 nC6-L
418 CYC6-L
421 nC7-L
424 Tol-L
500 containment vessel model
503 process relief mass
506 bulk liquid phase (string node 1)
509 liquid/vapor interface
512 energy absorption process/string model
515 bulk vapor phase (string node 2)
600 iC5-V
603 nC5-V
606 nC6-V
700 nC4-V
900 nC8-V
903 Equil Pres
1000 C4-C6-V
1003 C4-C6-L
1300 process variables/equations A number of implementations have been described. Nevertheless, it will be understood that various modifications may be made. For example, the steps of the disclosed techniques may be performed in a different sequence, components of the disclosed systems may be combined in a different manner, or the components may be supplemented with other components. Accordingly, other implementations are contemplated, within the scope of the following claims.

What is claimed is:

1. An apparatus comprising:

a pressure-equalized containment vessel (103) fluidly coupled to a Process Relief Device (PRD) (106), wherein the PRD (106) is configured to fluidly couple the containment vessel (103) with a process vessel (154) in response to a process relief event in the process vessel (154), and wherein the pressure-equalized containment vessel (103) is preloaded with a Low Vapor Pressure (LVP) liquid (130); and an evacuated headspace (136) above the LVP liquid (130) in the containment vessel (103), wherein the evacuated headspace (136) above the LVP liquid (130) has been partially filled with a High Vapor Pressure (HVP)

material (300) configured to flash to HVP material (300) vapors and occupy the headspace (136), and wherein the PRD (106) is configured to relieve a process relief mass (503) from the process vessel (154) into the containment vessel (103) during the process relief event and permit the HVP material (300) vapors to mix with the process relief mass (503) and condense to liquid in the containment vessel (103).

2. The apparatus of claim 1, wherein the HVP material (300) further comprises a plurality of hydrocarbons.

3. The apparatus of claim 2, wherein the plurality of hydrocarbons further comprises a 50/50 mixture of isopentane and n-pentane.

4. The apparatus of claim 2, wherein the plurality of hydrocarbons further comprises at least two hydrocarbons.

5. The apparatus of claim 2, wherein the plurality of hydrocarbons further comprises at least three hydrocarbons.

6. The apparatus of claim 2, wherein the plurality of hydrocarbons further comprises C4, C5 and C6.

7. The apparatus of claim 2, wherein the plurality of hydrocarbons further comprises C4, C5, C6, C7, C8, C9 and C10.

8. The apparatus of claim 2, wherein the plurality of hydrocarbons further comprises at least two of C4, C5, C6, C7, C8, C9 and C10.

9. The apparatus of claim 8, wherein the apparatus further comprises the containment vessel (103) configured to be fluidly coupled to a processing unit (148) to return the at least a portion of the process relief mass (503) recovered from the containment vessel (103) to the processing unit (148).

10. The apparatus of claim 1, wherein the apparatus further comprises a vent (112) configured to fluidly couple the containment vessel (103) with ambient conditions outside the containment vessel (103) to equalize pressure in the containment vessel (103) with the ambient conditions.

11. The apparatus of claim 10, wherein the apparatus further comprises a vent valve (115) configured to open or close the vent (112).

12. The apparatus of claim 11, wherein the apparatus further comprises the vent (112) is open.

13. The apparatus of claim 11, wherein the apparatus further comprises a fill valve (124) operably coupled with the containment vessel (103) to permit filling the containment vessel (103) with the LVP liquid (130).

14. The apparatus of claim 1, wherein the apparatus further comprises the containment vessel (103) is sealed from ambient conditions outside the containment vessel (103).

15. The apparatus of claim 14, wherein the apparatus further comprises a vent valve (115) configured to seal the containment vessel (103) from the ambient conditions based on closing a vent (112) configured to fluidly couple the containment vessel with the ambient conditions outside the containment vessel (103).

16. The apparatus of claim 14, wherein the apparatus further comprises a headspace vacuum (139) in the evacuated headspace (136) above the LVP liquid (130) in the containment vessel (103).

17. The apparatus of claim 1, wherein the apparatus further comprises a drain valve (121) in fluid communication with the containment vessel (103), wherein the drain valve (121) is configured to be open or closed, and wherein the drain valve (112) when open is operable to permit drawing down the LVP liquid (130) in the containment vessel (103) and form the evacuated headspace (136) above the LVP liquid (130) in the containment vessel (103).

18. The apparatus of claim 17, wherein the apparatus further comprises a draw pump (118) in fluid communication with the drain valve (121), wherein the draw pump (118) is configured to evacuate at least a portion of the LVP liquid (130) from the containment vessel (103) through the drain valve (121).

19. The apparatus of claim 18, wherein the apparatus further comprises the draw pump (118) is activated and the drain valve (112) is open.

20. The apparatus of claim 17, wherein the evacuated headspace (136) further comprises a headspace vacuum (139) and wherein the apparatus further comprises a source of HVP material configured to introduce HVP liquid into the evacuated headspace (136).

21. The apparatus of claim 17, wherein the apparatus further comprises a desired initial headspace vacuum (139) pressure in the evacuated headspace (136).

22. The apparatus of claim 21, wherein the desired initial headspace vacuum (139) pressure is less than a predetermined target vacuum pressure.

23. The apparatus of claim 21, wherein the apparatus further comprises a vacuum pressure sensor configured to permit determining the headspace vacuum (139) pressure.

24. The apparatus of claim 23, wherein the apparatus further comprises a controller configured to determine if the desired initial pressure of the headspace vacuum (139) has been reached using the vacuum pressure sensor and a predetermined threshold vacuum pressure.

25. The apparatus of claim 21, wherein the apparatus further comprises a controller configured to determine if the desired initial pressure of the headspace vacuum (139) has been reached based on using run time of a draw pump (118).

26. The apparatus of claim 21, wherein the apparatus further comprises a controller configured to determine if the desired initial pressure of the headspace vacuum (139) has been reached, and in response to determining the desired initial pressure of the headspace vacuum (139) has been reached, closing the drain valve (121) and stopping a draw pump (118).

27. The apparatus of claim 1, wherein the apparatus further comprises a sealed relief header (109) operably coupling an outlet of the PRD (106) into the containment vessel (103), wherein the process relief mass (503) is relieved from the process vessel (154) through the sealed relief header (109).

28. The apparatus of claim 27, wherein the apparatus further comprises the outlet of the PRD (106) is at an elevation higher than the containment vessel (103).

29. The apparatus of claim 27, wherein the apparatus further comprises the pressure-equalized containment vessel (103) is preloaded with the LVP liquid (130) having an LVP liquid (130) level higher than an elevation level at which the sealed relief header (109) connects to the containment vessel (103).

30. The apparatus of claim 1, wherein the apparatus further comprises at least a portion of the process relief mass (503) in a liquid state within the containment vessel (103), wherein the at least a portion of the process relief mass (503) in the liquid state within the containment vessel (103) is in equilibrium with an LVP liquid phase final temperature.

* * * * *